United States Patent [19]
Yamamoto et al.

[11] Patent Number: 5,456,643
[45] Date of Patent: Oct. 10, 1995

[54] SYSTEM FOR CONTROLLING AUTOMOBILE TRANSMISSION

[75] Inventors: Yoshinori Yamamoto, Wako; Yoshikazu Ishikawa, Hiki, both of Japan

[73] Assignee: Honda Giken Kogyo Kabushiki Kaisha, Tokyo, Japan

[21] Appl. No.: 74,949

[22] Filed: Jun. 10, 1993

[30] Foreign Application Priority Data

Jun. 10, 1992 [JP] Japan ................................. 4-176255
Jun. 10, 1992 [JP] Japan ................................. 4-176256

[51] Int. Cl.⁶ ................................................. B60K 41/08
[52] U.S. Cl. ................................................. 477/110
[58] Field of Search ...................... 477/101, 102, 477/103, 104, 106, 107, 109, 110, 111, 123, 124

[56] References Cited

U.S. PATENT DOCUMENTS

| | | | |
|---|---|---|---|
| 4,226,141 | 10/1980 | Espenschied | 477/110 |
| 4,458,644 | 7/1984 | Papst | 123/196 |
| 4,493,228 | 1/1985 | Vukovich et al. | 477/110 |
| 4,680,988 | 7/1987 | Mori | 477/110 |
| 4,817,451 | 4/1989 | Weismann | 74/333 |
| 5,239,894 | 8/1993 | Oikawa et al. | 477/107 |

FOREIGN PATENT DOCUMENTS

| | | | |
|---|---|---|---|
| 342643 | 11/1989 | European Pat. Off. | F16H 61/02 |
| 391604A3 | 10/1990 | European Pat. Off. | F16D 41/08 |
| 456511A2 | 11/1991 | European Pat. Off. | |
| 490627A | 6/1992 | European Pat. Off. | |
| 2578206 | of 0000 | France. | |
| 61-94830A | 5/1986 | Japan | B60K 41/28 |
| 3194256 | 8/1991 | Japan | F16H 61/04 |
| 4215531 | 8/1992 | Japan | B60K 41/04 |
| 2241756 | 9/1991 | United Kingdom | F16H 61/04 |

OTHER PUBLICATIONS

English Language Abstract of the above-listed Japanese Publication.
European Search Report.

*Primary Examiner*—Charles A. Marmor
*Assistant Examiner*—Nathan O. Jensen
*Attorney, Agent, or Firm*—Lyon & Lyon

[57] ABSTRACT

A system for controlling an automobile transmission effects a gear change by disengaging synchronizing clutch means for a present gear position, achieving a neutral gear position, and then engaging a synchronizing clutch for a next gear position in response to a shift control signal. The automobile transmission has an actuator for selectively engaging and disengaging the synchronizing clutch. An electronic control unit controls an engine output adjusting assembly to adjust the output power of the engine and also controls the actuator to start disengaging the synchronizing clutch for a present gear position in response to a shift command signal. The electronic control unit also controls the actuator to complete disengaging the synchronizing clutch for a present gear position to enter the neutral gear position when substantially no load is transmitted between drive and driven members of the synchronizing clutch for a present gear position under the control of the engine output adjusting assembly.

24 Claims, 20 Drawing Sheets

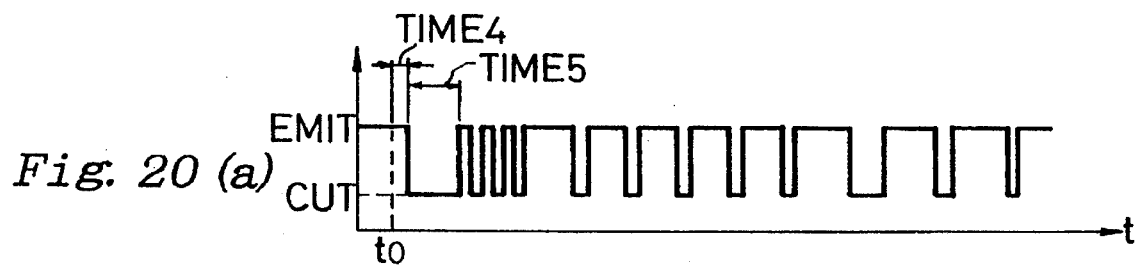
Fig. 20 (a)
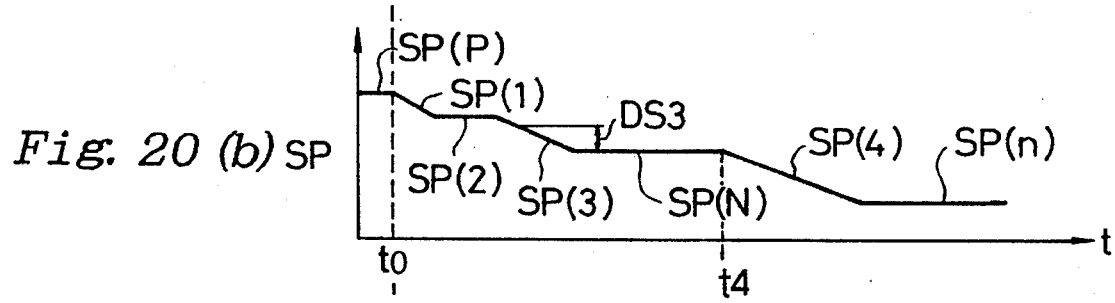
Fig. 20 (b) SP
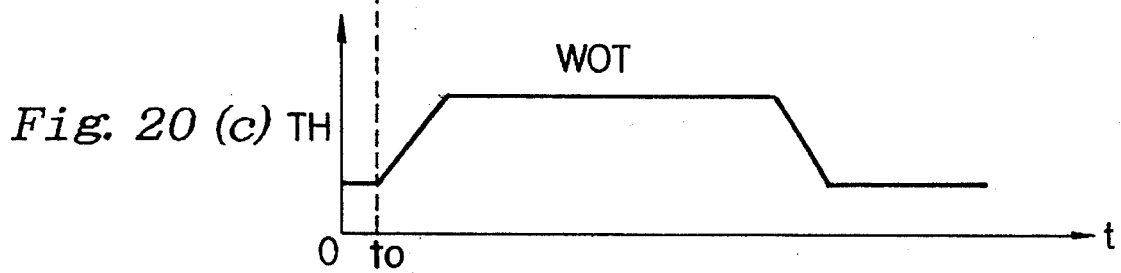
Fig. 20 (c) TH
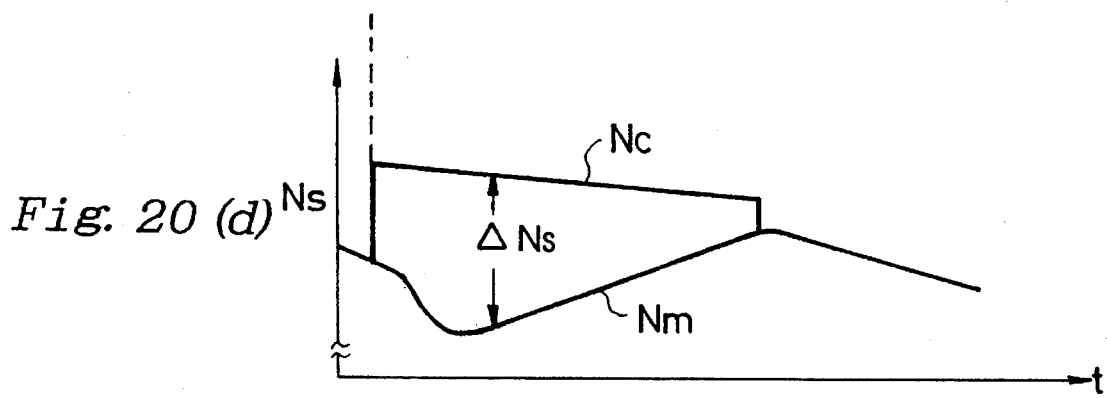
Fig. 20 (d) Ns

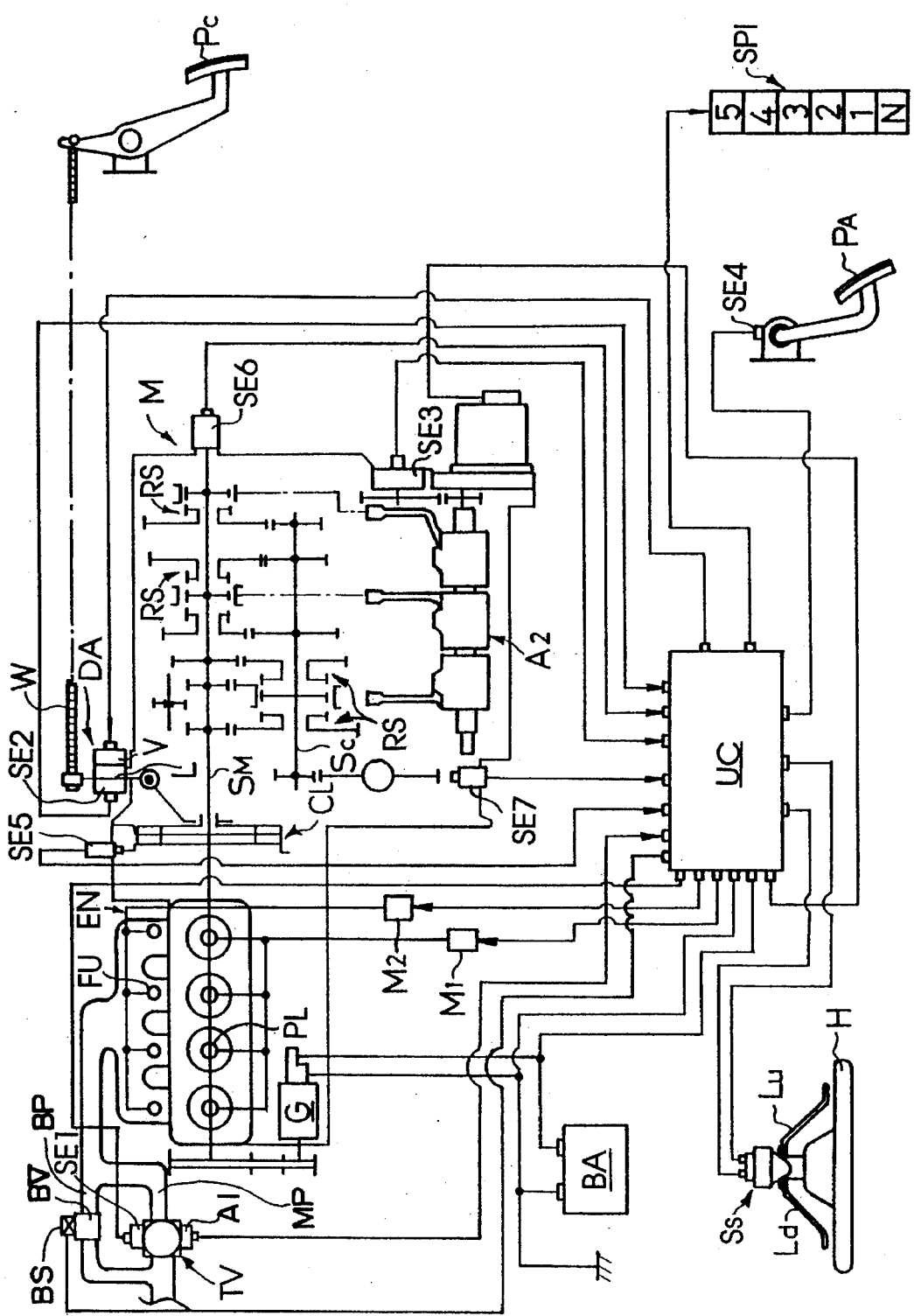

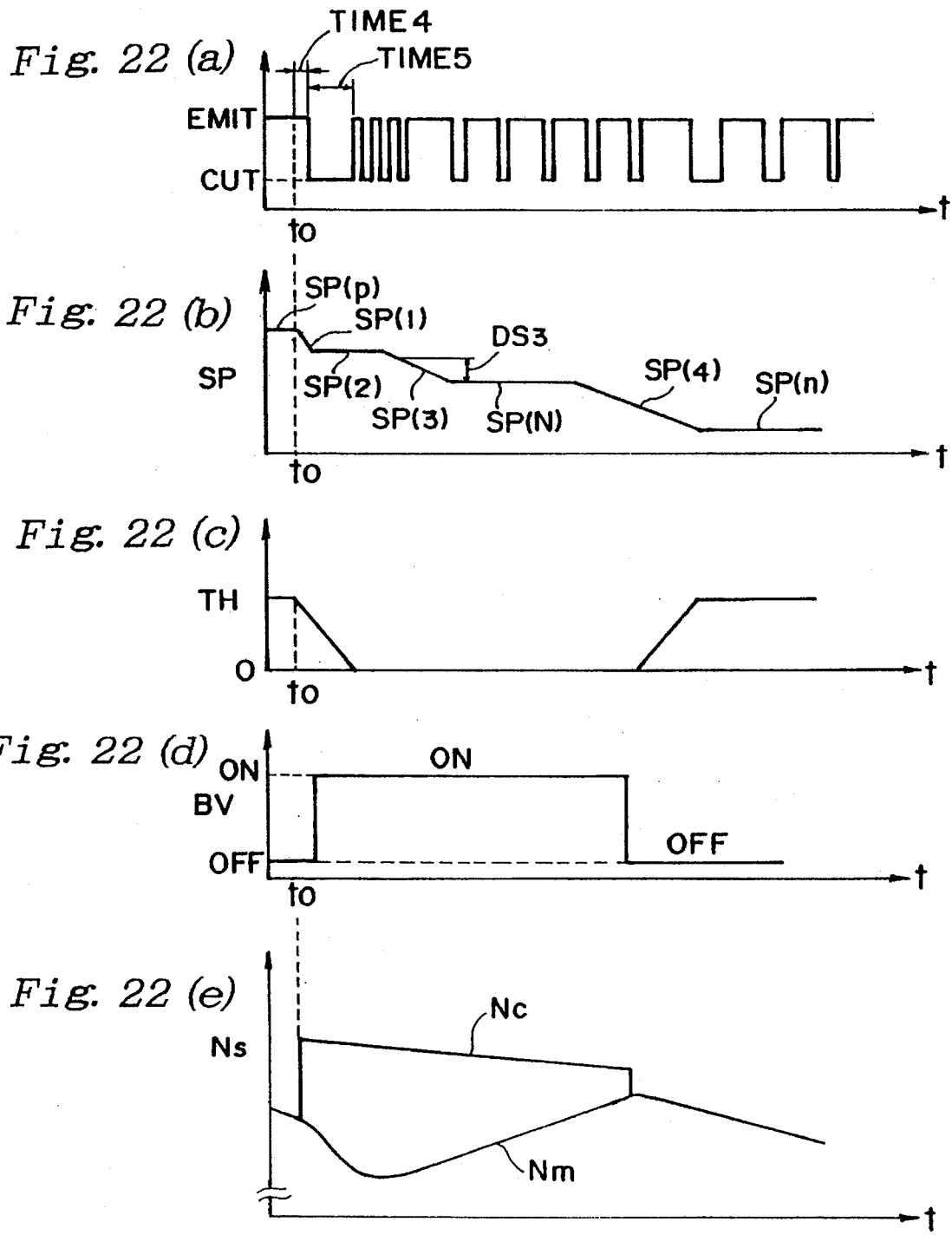

5,456,643

SYSTEM FOR CONTROLLING AUTOMOBILE TRANSMISSION

BACKGROUND OF THE INVENTION

1. Field of the Invention

The present invention relates to a transmission control system responsive to a shift control signal for effecting a gear change or shift by disengaging a synchronizing clutch for a present gear position, achieving a neutral gear position, and then engaging a synchronizing clutch for a next gear position.

2. Description of the Prior Art

Synchronizing clutches are clutches engageable by meshing mechanical components. They include a clutch with a synchromesh mechanism, a clutch with a roller synchronizing mechanism, and a clutch with a dog tooth mechanism.

There are known automobile transmissions which control gear changes or shifts with controlled engagement and disengagement of synchronizing clutches. One transmission which comprises synchronizing clutches with roller synchronizing mechanisms is disclosed in U.S. Pat. No. 4,817,451, for example.

Japanese laid-open patent publication No. 61-94830 discloses an automatic transmission for automatically carrying out gear changes with synchronizing clutches. When input and output members of a synchronizing clutch rotate out of synchronism with each other, an output torque transmitted through the synchronizing clutch acts to prevent the clutch from being engaged or disengaged, resulting in an increased force required to bring the gears out of mesh with each other. It is therefore necessary to disengage or engage the synchronizing clutch when the torque transmitted therethrough is eliminated and hence the force required to bring the gears out of mesh with each other is eliminated.

When the automatic transmission disclosed in Japanese laid-open patent publication No. 61-94830 is to make a gear change, a transmission actuator applies a force to a synchronizing clutch for a present gear position, which force is of a minimum level required to bring this synchronizing clutch into a neutral gear position. At the same time, the throttle valve of an engine coupled to the automatic transmission is gradually closed to lower the output power of the engine. When the output torque transmitted from the engine through the synchronizing clutch for a present gear position is substantially eliminated and hence the force required to disengage this synchronizing clutch, i.e., when drive and driven members of the synchronizing clutch are free of loads, the synchronizing clutch is brought into the neutral gear position of their own accord under the force imposed by the transmission actuator.

If the output torque of the engine which is transmitted through the synchronizing clutch for a present gear position abruptly dropped to a zero or non-load condition and then to a negative level, then since the output torque of the engine would be eliminated for a very short period of time, the gears could not be brought out of mesh with each other, and hence the neutral gear position could not be achieved. To avoid this drawback, the throttle valve of the engine is gradually closed to lower the output torque of the engine gradually for allowing the gears to be brought reliably out of mesh with each other.

According to such a control process, however, because the throttle valve of the engine starts being gradually closed after a shift command has been issued, it takes a certain period of time until the synchronizing clutch for a present gear position is disengaged to reach the neutral gear position after the shift command has been issued. Therefore, the operation of the transmission to accomplish a gear change is relatively slow.

Furthermore, the above control is effective only when the output torque of the engine is of a positive value, i.e., the engine is being accelerated, at the time the transmission starts to effect a gear change. That is, only when the output torque of the engine is of a positive value under an accelerating condition, the throttle valve is gradually closed to lower the output torque, and the neutral gear position is reached when the output torque substantially drops to a zero level, i.e., the transmission is subject to no load. If the output torque were of a negative value, i.e., the engine were being decelerated, or the output torque were zero, i.e., the transmission were under no load, at the time the transmission starts to effect a gear change, then closing the throttle valve would additionally lower the output torque of the engine. The output torque would thus not drop to zero, failing to disengage the synchronizing clutch for a present gear position.

In view of the above shortcomings of the conventional transmission control system, it has been proposed, as disclosed in Japanese patent application No. 2-401192, to employ a map of throttle valve openings and engine rotational speeds, the map including an accelerating region where the engine output torque is positive and a decelerating region where the engine output torque is negative, and to determine whether the engine is being accelerated or decelerated using the map at the time the transmission starts to make a gear change. If the engine is determined as being accelerated, then the engine output power is lowered until a non-load condition is reached, i.e., until the engine output torque transmitted through the synchronizing clutch for a present gear position drops to zero, when the synchronizing clutch is disengaged. Conversely, if the engine is determined as being decelerated, then the engine output power is increased until a non-load condition is reached, when the synchronizing clutch for a present gear position is disengaged.

However, if the engine condition is in the boundary between the accelerated and decelerated conditions at the time the transmission starts to make a gear change, i.e., if the engine output torque transmitted through the synchronizing clutch for a present gear position is in the vicinity of the zero level, then it is difficult to determine whether the engine is being accelerated or decelerated. When this happens, controlling the transmission for a gear change may become unstable.

The unstable transmission control is problematic in that since the transmission may not effect a downshift, for example, when a downshift command is issued, the automobile may not be decelerated even though the driver wishes to decelerate the automobile through a downshift. As a result, the automobile tends to lose stability while it is running.

SUMMARY OF THE INVENTION

It is therefore an object of the present invention to provide a system for controlling an automobile transmission to effect gear changes through smooth, quick, and reliable disengagement of synchronizing clutches.

Another object of the present invention is to provide a system for controlling an automobile transmission to carry out a downshift reliably and quickly based on a downshift command.

According to the present invention, the above objects can be achieved by a system for controlling an automobile transmission to effect a gear change by disengaging a synchronizing clutch means for a present gear position, achieving a neutral gear position, and then engaging a synchronizing clutch means for a next gear position in response to a shift control signal, the system comprising a shift command means for outputting a shift command signal, an actuator for selectively engaging and disengaging the synchronizing clutch means, and an engine output adjusting means for adjusting an output power of an engine. In response to the shift command signal from the shift command means, the engine output adjusting means adjusts the output power of the engine, the actuator starts disengaging the synchronizing clutch means for a present gear position. The actuator completes disengaging the synchronizing clutch means for a present gear position to enter the neutral gear position when substantially no load is transmitted between drive and driven members of the synchronizing clutch means for a present gear position under the control of the engine output adjusting means. Thereafter, the synchronizing clutch means for a next gear position is engaged to complete the gear change.

The engine output adjusting means is responsive to the shift command signal from the shift command means for effecting a first engine output adjusting mode to quickly lower the output power of the engine for a first period of time from the reception of the shift command signal, and effecting a second engine output adjusting mode to gradually lower the output power of the engine for a second period of time following the first period of time. In response to the shift command signal from the shift command means, the actuator starts disengaging the synchronizing clutch means for a present gear position and completes disengaging the synchronizing clutch means for a present gear position to enter the neutral gear position when substantially no load is transmitted between the drive and driven members of the synchronizing clutch means for a present gear position in the second engine output adjusting mode effected by the engine output adjusting means.

The engine output adjusting means may comprise engine output generating means for generating the output power of the engine and engine output controlling means for controlling the engine output generating means. The engine output controlling means is responsive to the shift command signal from the shift command means for effecting a first engine output adjusting mode to shut off the engine output generating means for a first period of time from the reception of the shift command signal, and effecting a second engine output adjusting mode to intermittently shut off the engine output generating means for a second period of time following the first period of time. Responsive to the shift command signal from the shift command means, the actuator starts disengaging the synchronizing clutch means for a present gear position. The actuator completes disengaging the synchronizing clutch means for a present gear position to enter the neutral gear position when substantially no load is transmitted between the drive and driven members of the synchronizing clutch means for a present gear position in the second engine output adjusting mode effected by the engine output controlling means.

The engine output generating means may comprise an ignition controlling means for controlling ignition of the engine, or a fuel injection control means for controlling fuel injection of the engine. In the first engine output adjusting mode, the ignition controlling means or the fuel injection control means is completely shut off, and in the second engine output adjusting mode, the ignition controlling means or the fuel injection control means is intermittently shut off.

Alternatively, the engine output adjusting means may comprise engine output generating means for generating the output power of the engine, engine output controlling means for controlling the engine output generating means, and intake control means for adjusting the amount of intake air to be supplied to the engine. In response to the shift command signal from the shift command means, intake control means increases the amount of intake air and the actuator starts disengaging the synchronizing clutch means for a present gear position. At the same time, the engine output controlling means shuts off the engine output generating means to bring the synchronizing clutch means for a present gear position into a decelerated condition for a first period of time from the reception of the shift command signal. Thereafter, the actuator completes disengaging the synchronizing clutch means for a present gear position to enter the neutral gear position when the output power of the engine is increased until no load is transmitted between the drive and driven members of the synchronizing clutch means for a present gear position.

The engine output adjusting means may alternatively comprise engine output generating means for generating the output power of the engine, engine output controlling means for controlling the engine output generating means, a throttle valve for adjusting the amount of intake air to be supplied to the engine, a bypass intake passage for supplying intake air to the engine in bypassing relationship to the throttle valve, and bypass opening/closing means for selectively opening and closing the bypass intake passage. In response to the shift command signal from the shift command means, the throttle valve is fully closed and the bypass opening/closing means is fully opened. The engine output controlling means effects a first engine output adjusting mode to shut off the engine output generating means for a first period of time from the reception of the shift command signal, and a second engine output adjusting mode to intermittently shut off the engine output generating means for a second period of time following the first period of time. The actuator starts disengaging the synchronizing clutch means for a present gear position from the reception of the shift command signal and completes disengaging the synchronizing clutch means for a present gear position to enter the neutral gear position when substantially no load is transmitted between the drive and driven members of the synchronizing clutch means for a present gear position in the second engine output adjusting mode effected by the engine output controlling means.

The control process carried out for speed changes by the automobile transmission control system is suitable particularly for making downshifts.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 20(a) 20(b), 20(c), and 20(d) are graphs showing the fuel injection, the shift position, the throttle valve opening, and the transmission shaft rotational speed, respectively, as they vary with time;

FIG. 21 is a schematic diagram of a system for controlling an automobile transmission according to another embodiment of the present invention; and FIGS. 22(a), 22(b), 22(c), 22(d), and 22(e) are graphs showing the fuel injection, the shift position, the throttle valve opening, time bypass valve opening, and the transmission shaft rotational speed, respectively, as they vary with time.

DETAILED DESCRIPTION OF THE PREFERRED EMBODIMENTS

Figure 1:
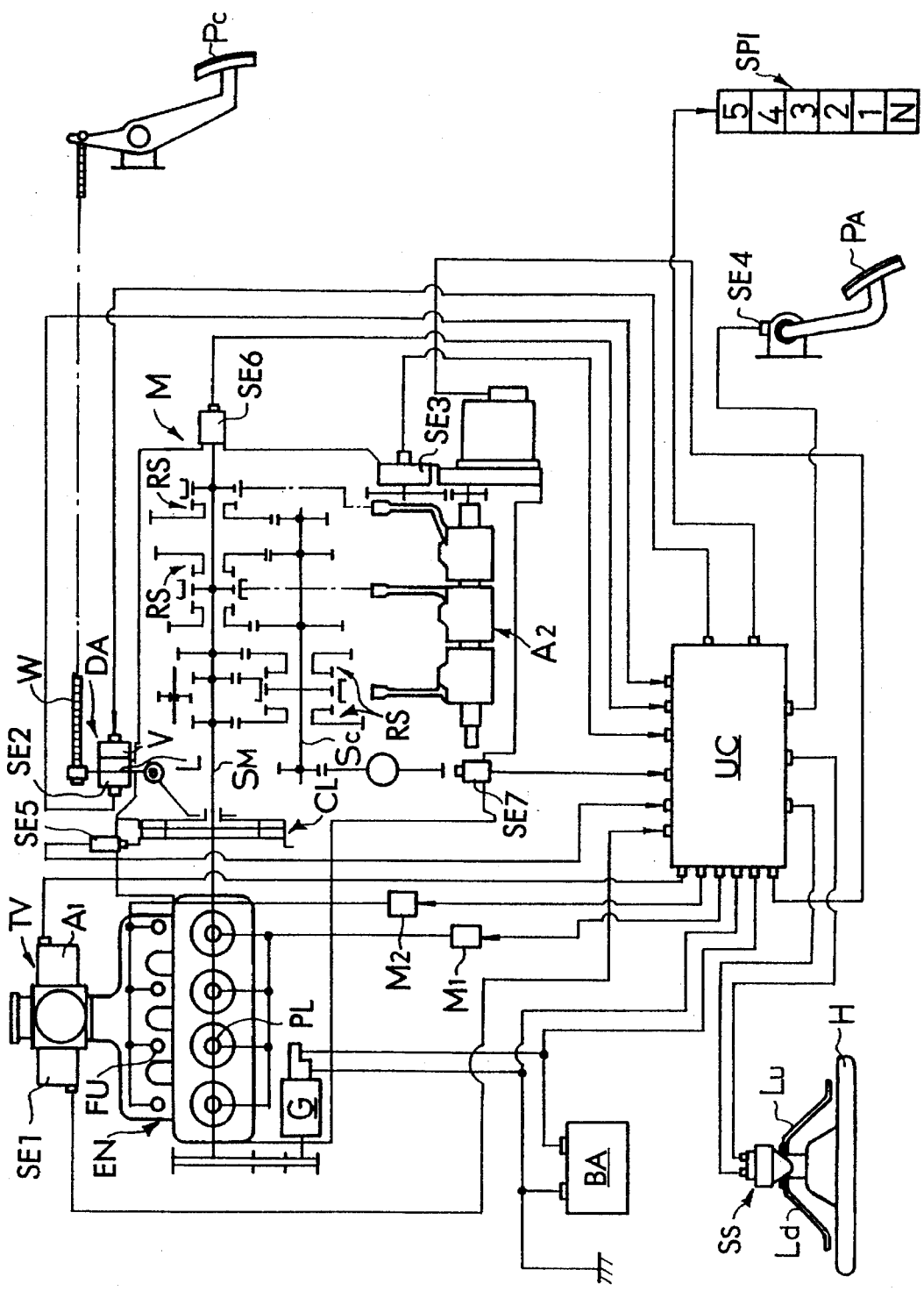
FIG. 1 is a schematic diagram of a system for controlling an automobile transmission according to an embodiment of the present invention.

As shown in FIG. 1, an automobile transmission control system according to an embodiment of the present invention, which is mounted on an automobile, generally comprises a multirange transmission M coupled to an in-line four-cylinder engine EN through a clutch CL, and an electronic control unit UC (transmission controller) for controlling the transmission M. The engine EN has a throttle valve TV whose opening is controllable for varying the rotational speed of the engine EN. The throttle valve TV is associated with a throttle actuator A1 which adjusts or controls the opening of the throttle valve TV and a throttle valve opening sensor SE1 which detects the opening of the throttle valve TV. The throttle actuator A1 and the throttle valve opening sensor SE1 are electrically connected to the electronic control unit UC.

The clutch CL is coupled to a clutch pedal Pc through a wire cable W and also to a clutch damper DA having an orifice control solenoid-operated valve V. The clutch CL can be engaged and disengaged under hydraulic pressure by the clutch damper DA in response to operation of the clutch pedal Pc. A lever L which is movable with the clutch damper DA is associated with a clutch stroke sensor SE2 which detects the position of the lever L, the clutch stroke sensor SE2 being electrically connected to the electronic control unit UC.

The engine EN has spark plugs PL and fuel injection valves FU which are controlled by the electronic control unit UC to control the output power produced by the engine EN. The spark plugs PL and the fuel injection valves FU are electrically connected to the electronic control unit UC through a spark controller M1 and a fuel supply controller M2, respectively. The spark controller M1, the fuel supply controller M2, and the electronic control unit UC jointly control energization and de-energization of the spark plugs PL and also fuel injection and fuel cutting-off through the fuel injection valves FU.

The multirange transmission M has a main shaft SM, a countershaft SC, and a plurality of gear trains disposed between the main shaft SM and the countershaft SC for establishing any desired one of the multiple gear positions. Each of the gear trains is combined with a roller synchronizing mechanism RS for connecting the gears to the main shaft SM and the countershaft SC. The roller synchronizing mechanisms RS are actuatable by a drum-type shift actuator A2 coupled to the electronic control unit UC whose shift position is detected by a shift position sensor SE3 and indicated by a shift position indicator SPI.

A steering wheel H is combined with a steering shift mechanism $S_5$ having a shift-up lever Lu for outputting an upshift command and a shift-down lever Ld for outputting a downshift command. The steering shift mechanism $S_5$ is electrically connected to the electronic control unit UC.

To the electronic control unit UC, there are also electrically connected an accelerator pedal movement sensor SE4 for detecting the depressed position of an accelerator pedal PA, an engine rotational speed sensor SE5 for detecting the rotational speed of the crankshaft of the engine EN, a main shaft rotational speed sensor SE6 for directly detecting the rotational speed of the main shaft SM of the multirange transmission M, and a countershaft rotational speed sensor SE7 for detecting the rotational speed of the countershaft SC of the multirange transmission M through the rotational speed of an input gear operatively coupled to the countershaft SC.

The electronic control unit UC is electrically connected to a battery BA that is charged by a generator G on the automobile.

The roller synchronizing mechanisms RS will be described below with reference to FIGS. 2 through 5.

Figure 2:
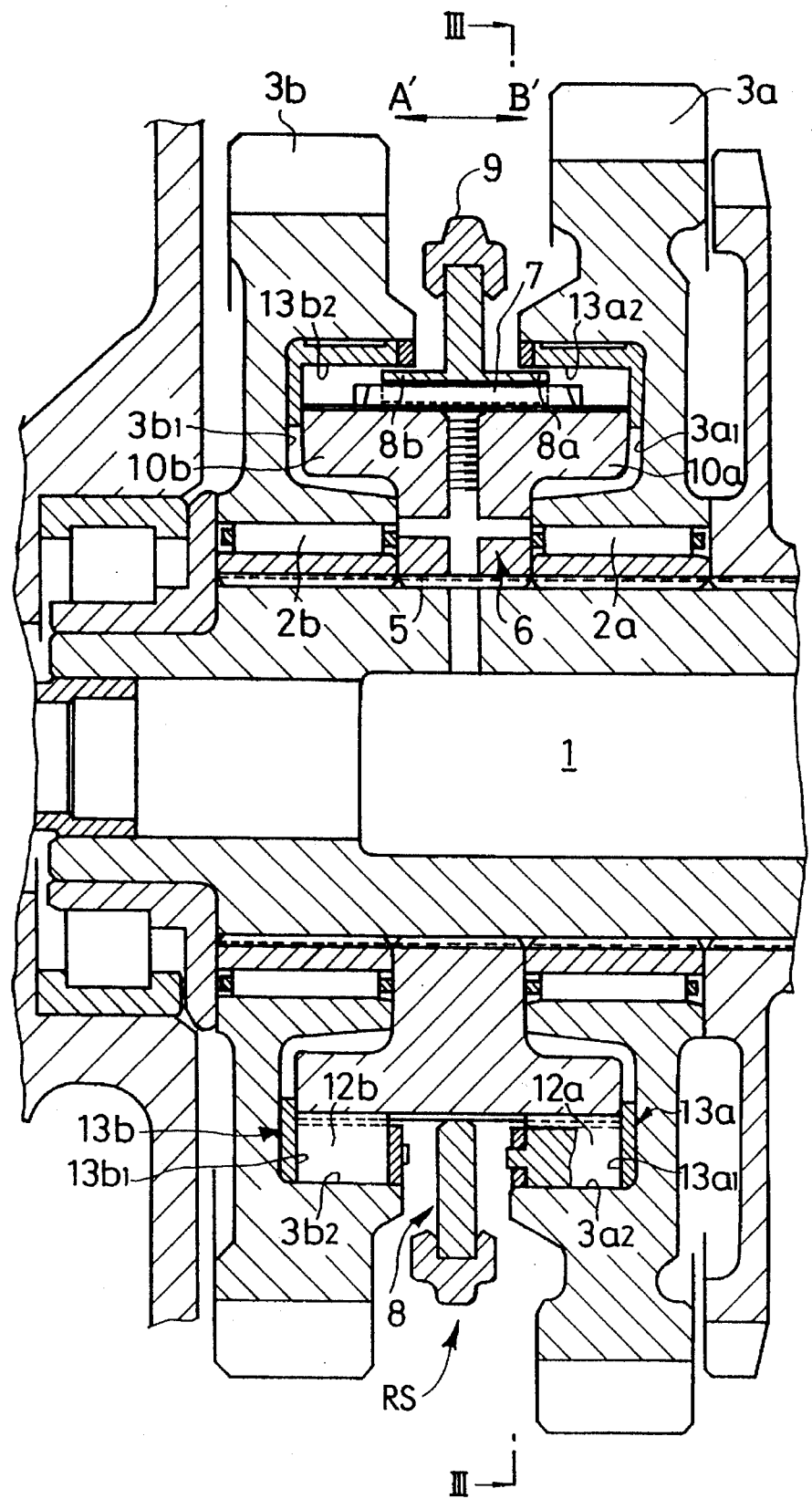
FIG. 2 is a fragmentary cross-sectional view of a roller synchronizing mechanism that can be controlled by the system.

As shown in FIG. 2, the roller synchronizing mechanism RS for an nth gear position has a gear 3a that is relatively rotatably supported by a needle bearing 2a on a rotatable shaft 1 which serves as either the main shaft SM or the countershaft SC of the multirange transmission M. The roller synchronizing mechanism RS for an (n+1)th gear position has a gear 3b that is also relatively rotatably supported by a needle bearing 2b on the rotatable shaft 1, the gear 3b being axially spaced from the gear 3a. Between the gears 3a, 3b, there is axially slidably supported a boss 6 on the rotatable shaft 1 by splines 5. A sleeve 8 is axially slidably supported on the boss 6 by splines 7. When the sleeve 8 is axially moved by a tip end 9 of a fork, the gear 3a or the 3b is corotatably coupled to the rotatable shaft 1 thus establishing the nth gear position or the (n+1)th gear position.

Figure 3:
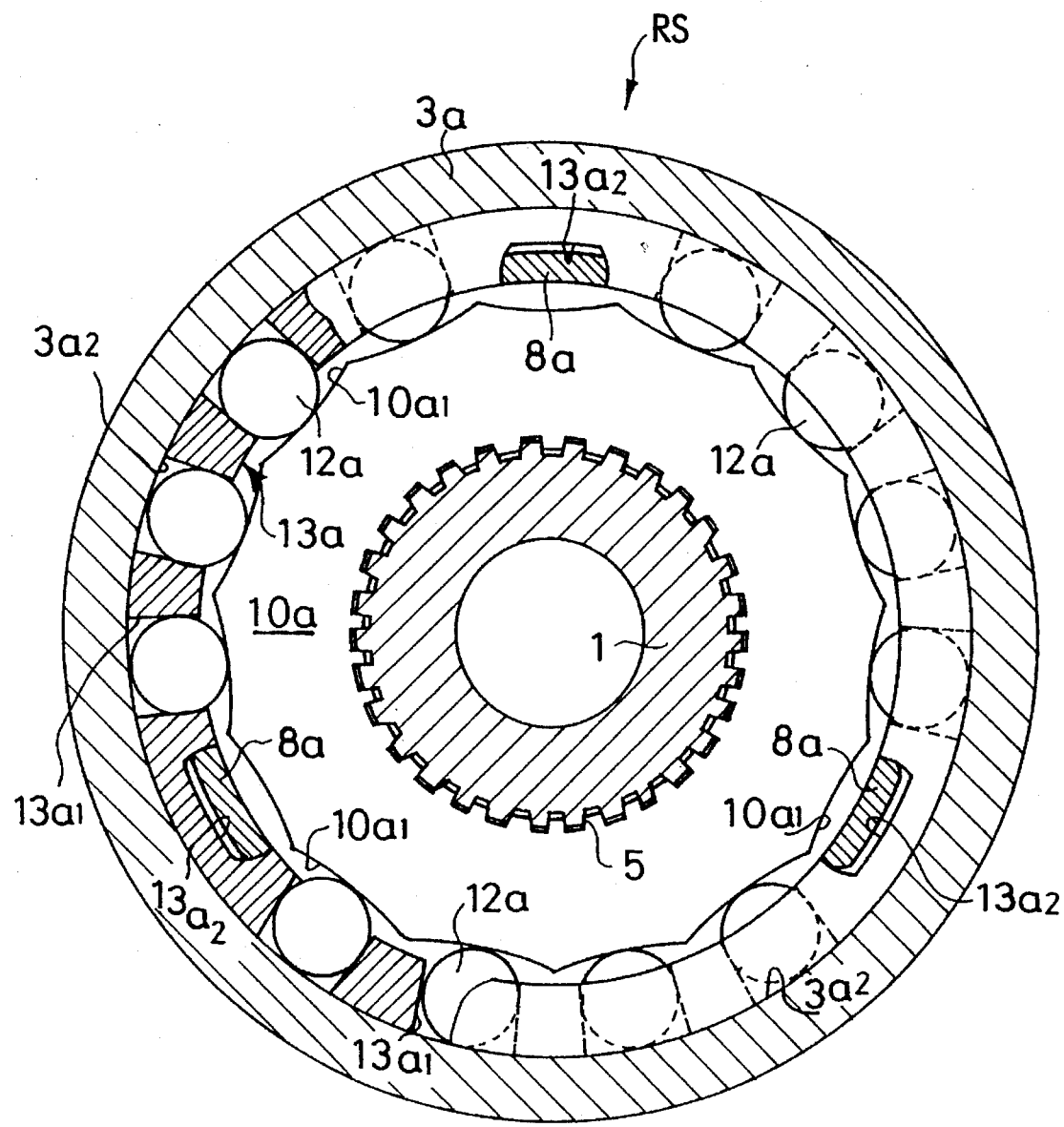
FIG. 3 is a cross-sectional view taken along line III—III of FIG. 2.
Figure 4:
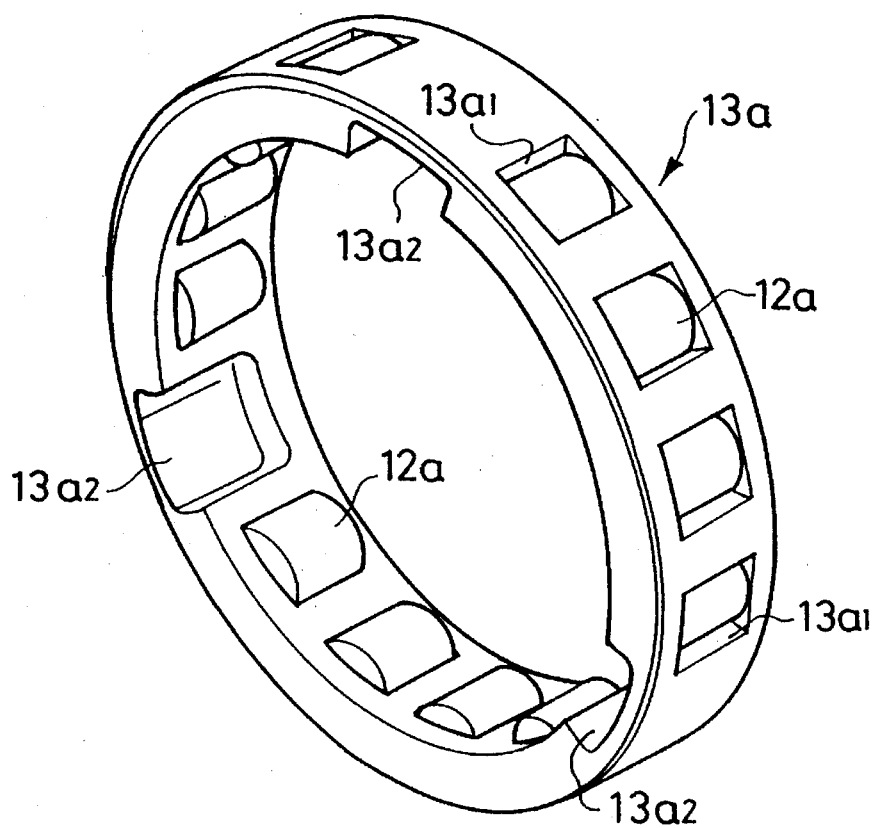
FIG. 4 is a perspective view of a retainer of the roller synchronizing mechanism.

Referring to FIG. 3, in addition to FIG. 2, the gear 3a has an annular recess 3a1 (FIG. 2) defined in a side surface thereof, and the boss 6 has an integral ring-shaped inner cam 10a positioned in the annular recess 3a1. The inner cam 10a has a plurality of V-shaped cam grooves 10a1 defined in its outer circumferential surface. A plurality of rollers 12a are disposed respectively between the cam grooves 10a1 and a roller contact surface 3a2 on the inner circumferential surface of the recess 3a1.

A ring-shaped retainer 13a (see FIG. 4) is disposed between the inner cam 10a and the roller contact surface 3a2 and has an outer circumferential surface relatively rotatably held in contact with the roller contact surface 3a2. The retainer 13a has a plurality of circumferentially spaced roller support holes 13a1 extending radially therethrough and positioned in alignment with the respective cam grooves 10a1. The rollers 12a are retained in the roller support holes 13a1 for slight radial movement therein. The retainer 13a also has three dowel insertion slots 13a2 defined in 120°-spaced relationship in an inner circumferential surface thereof, the dowel insertion slots 13a2 extending axially and opening at one side surface of the retainer 13a.

The sleeve 8 has three dowels 8a projecting axially in 120°-spaced relationship from a side surface thereof. When the sleeve 8 is axially moved on the boss 6 through the splines 7, the dowels 8a move into and out of the respective dowel insertion slots 13a2 (see FIG. 5). When the dowels 8a engage in the respective dowel insertion slots 13a2, the inner cam 10a and the retainer 13a are positioned as shown in FIG. 3, and the rollers 12a are fitted centrally in the cam grooves 10a1, respectively.

The roller synchronizing mechanism RS of the (n+1)th gear position is symmetrically identical in structure to the roller synchronizing mechanism RS for the nth gear position, and hence will not be described in detail below. The components of the roller synchronizing mechanism RS for the (n+1)th gear position are denoted by identical reference numerals with a suffix b.

Operation of the roller synchronizing mechanism RS for the nth gear position, by way of example, will be described below.

Figure 5:
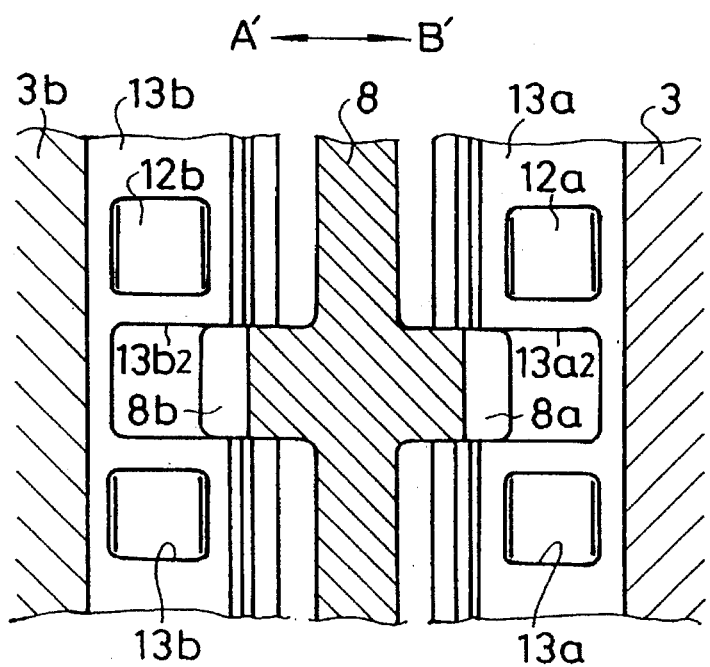
FIG. 5 is a fragmentary cross-sectional view of the roller synchronizing mechanism.

When the sleeve 8 is in a neutral position shown in FIGS. 2 and 5 with the dowels 8a fitted in the respective dowel insertion slots 13a2, the inner cam 10a and the retainer 13a are positioned as shown in FIG. 3 by the rotatable shaft 1, the boss 6, the dowels 8a, and the dowel insertion slots 13a2. The rollers 12a retained by the retainer 13a are moved radially inwardly in the roller support holes 13a1 and slightly spaced from the roller contact surface 3a2. The outer circumferential surface of the retainer 13a now slides against the roller contact surface 3a2, preventing a torque from being transmitted between the rotatable shaft 1 and the gear 3a. At this time, the dowels 8b of the sleeve 8 are also fitted in the respective dowel insertion slots 13b2 of the retainer 13b, preventing a torque from being transmitted between the rotatable shaft 1 and the gear 3b.

The roller synchronizing mechanism RS for the (n+1)th gear position is now held in a neutral position.

Axial movement of the sleeve 8 in the direction indicated by the arrow A' in FIG. 5 places the dowels 8a out of the dowel insertion slots 13a2, thus allowing the retainer 13a and the inner cam 10a to rotate relatively to each other. The retainer 13a and the inner cam 10a are rotated slightly relatively to each other by a torque transmitted from the rotatable shaft 1 or the gear 3a. The rollers 12a are wedged radially outwardly in the roller support holes 13a1 by the respective cam grooves 10a1 and pressed against the roller contact surface 3a2. The inner cam 10a and the gear 3a, and hence the rotatable shaft 1 and the gear 3a, are corotatably coupled to each other, establishing the nth gear position. When the sleeve 8 is axially moved in the direction indicated by the arrow B' in FIG. 5, the rotatable shaft 1 and the gear 3b are corotatably coupled to each other, establishing the (n+1)th gear position.

The shift actuator A2 will be described below with reference to FIGS. 6 and 7.

Figure 6:
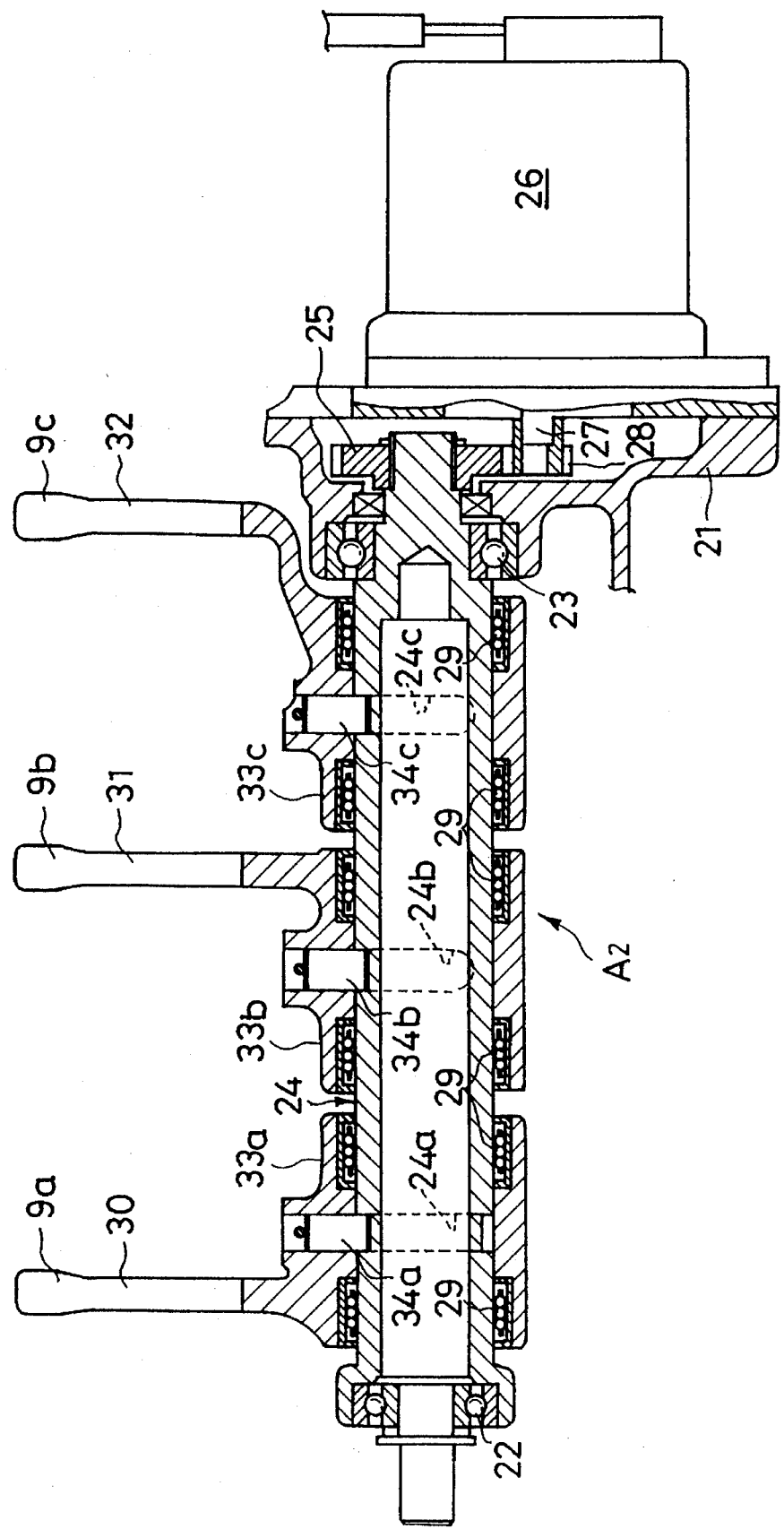
FIG. 6 is a cross-sectional view of a shift actuator of the system.
Figure 7:
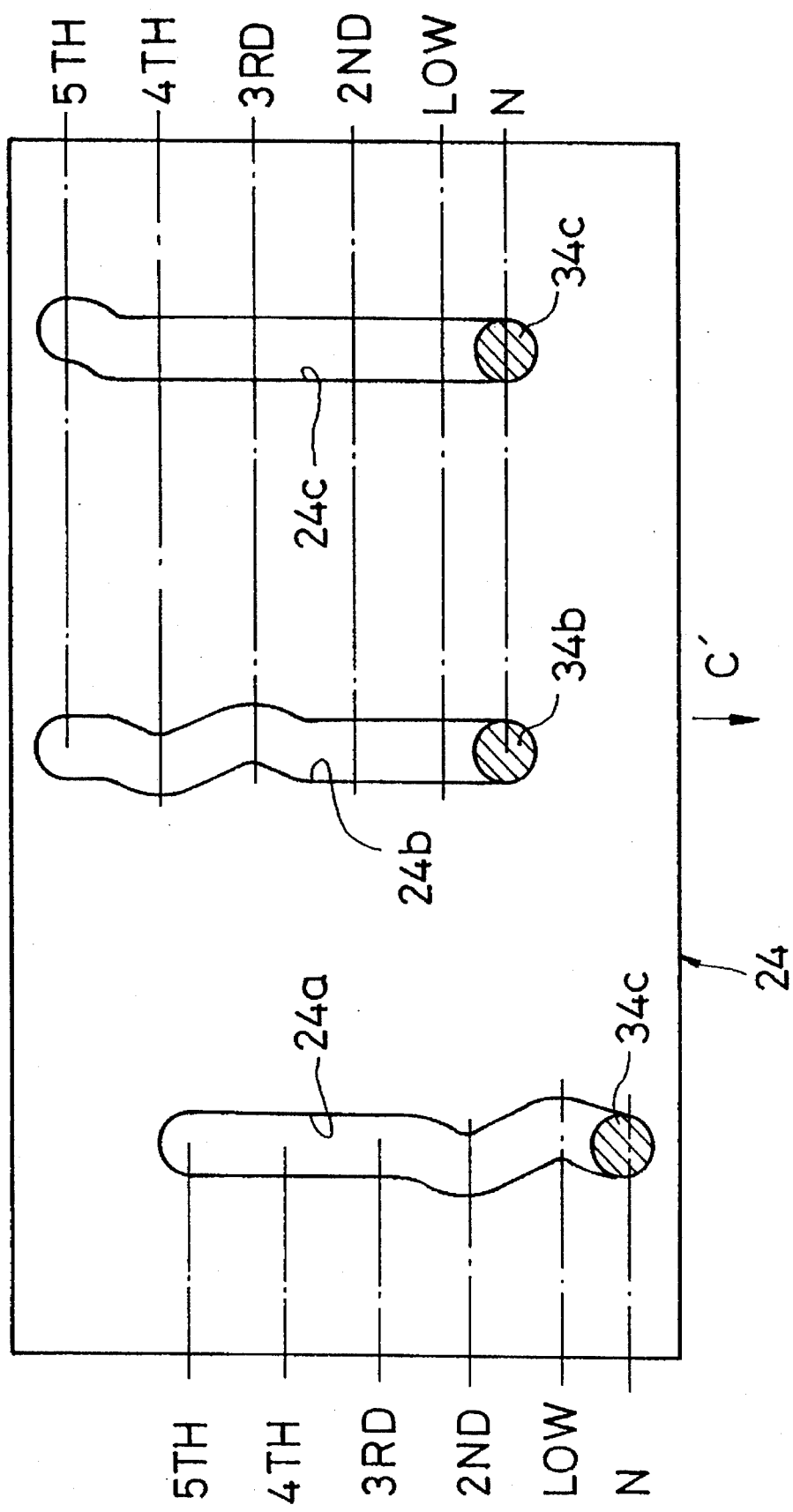
FIG. 7 is a plan view showing, in a developed fashion, cam grooves in a shift drum of the shift actuator.

As shown in FIG. 6, the multirange transmission M has a casing 21 in which a cylindrical shift drum 24 is rotatably supported at its opposite ends by a pair of ball bearings 22, 23. A driven gear 25 fixed to one of the ends of the shift drum 24 is held in mesh with a drive gear 28 that is fixed to a drive shaft 27 of a shift motor 26 mounted on the casing 21. Rotation of the shift drum 24 can thus be controlled by the shift motor 26 which comprises a stepping motor in this embodiment.

Three shift forks 30, 31, 32 have respective tubular ends 33a, 33b, 33c slidably fitted over and supported on the shift drum 24 by respective pairs of slide bearings 29. As also shown in FIG. 7, the shift drum 24 has three cam grooves 24a, 24b, 24c defined therein and receiving respective radial pins 34a, 34b, 34c mounted on the tubular ends 33a, 33b, 33c of the respective shift forks 30, 31, 32.

The shift forks 30, 31, 32 have respective tip ends 9a, 9b, 9c positioned remotely from the tubular ends 33a, 33b, 33c thereof and engaging respective three sleeves 8 (see FIG. 2) of the corresponding roller synchronizing mechanisms RS.

The transmission M has five roller synchronizing mechanisms RS for establishing five forward gear positions, i.e., LOW, 2ND, 3RD, 4TH, and 5TH gear positions. Four of these five roller synchronizing mechanisms RS are arranged in pairs as shown in FIGS. 2 through 5, and used to establish the LOW, 2ND, 3RD, and 4TH gear positions, respectively. The other roller synchronizing mechanism RS comprises one of the two mechanisms shown in FIG. 2, and is used to establish the 5TH gear position.

These five gear positions are established by controlling rotation of the shift drum 24 with the shift motor 26. In an N (neutral) gear position, for example, the pins 34a, 34b, 34c are positioned in the respective cam grooves 24a, 24b, 24c as shown in FIG. 7. When the shift drum 24 rotates from the N gear position, the pins 34a, 34b, 34c move in and along the respective cam grooves 24a, 24b, 24c, axially moving the corresponding shift forks 30, 31, 32 to successively establish the corresponding gear positions. For example, when the shift drum 24 rotates in the direction indicated by the arrow C' in FIG. 7 to bring the pins 34a, 34b, 34c to a position LOW in FIG. 7, only the pin 34a moves to the right, moving the shift fork 30 to the right. The shift fork 30 actuates the roller synchronizing mechanism RS for the LOW gear position to establish the LOW gear position.

As described above, the shift motor 2 controls rotation of the shift drum 24 to control gear changes in the transmission control system.

An operation sequence for controlling the gear changes will be described below.

Figure 8:
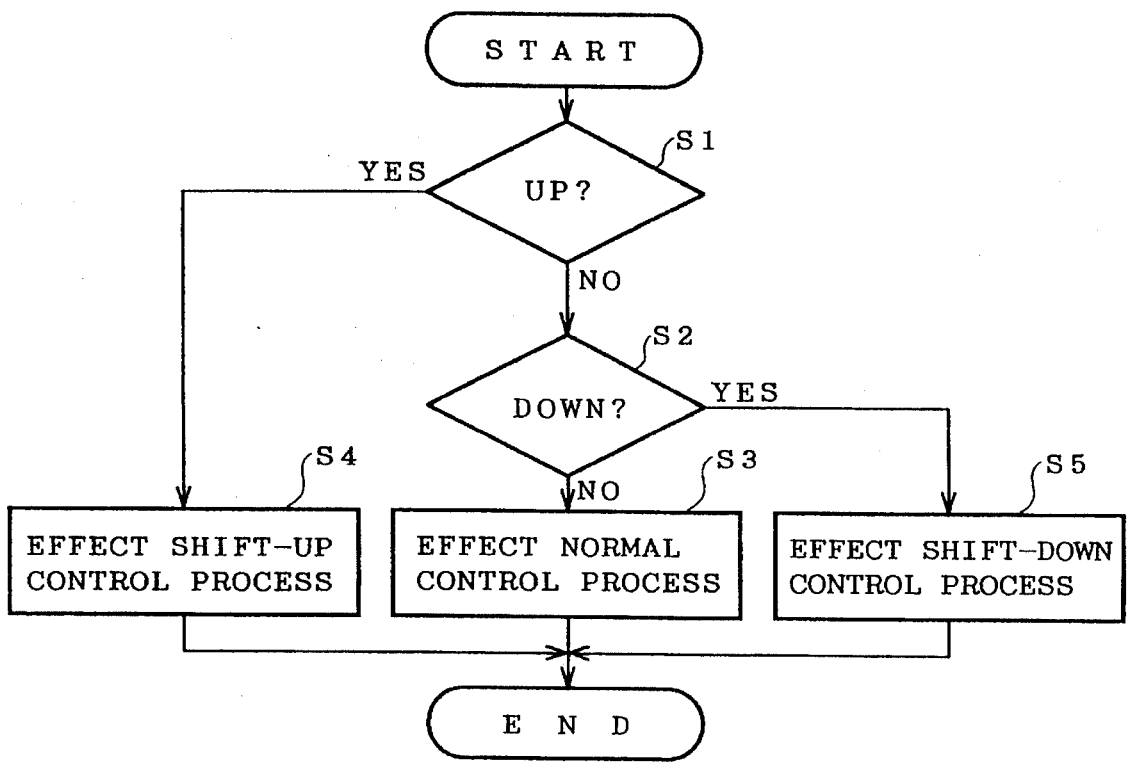
FIG. 8 is a flowchart of a gear-change control sequence of the system.

The gear-change control sequence is executed according to the flowchart of FIG. 8. First, steps S1, S2 of the gear-change control sequence determine whether there is an upshift or downshift command signal from the shift-up lever Lu or the shift-down lever Ld of the steering shift mechanism $S_5$, i.e., whether the driver of the automobile has operated on the shift-up lever Lu or the shift-down lever Ld.

If there is no upshift or downshift command signal, then the engine EN is controlled according to a normal control process in a step S3. In the normal control process, the electronic control unit UC operates the throttle actuator A1 to control the engine EN based on an output signal from the accelerator pedal movement sensor SE4 which detects the depressed position of the accelerator pedal sensor PA.

If an upshift command signal is produced by the shift-up lever Lu, then control goes from the step S1 to a step S4 for a shift-up control process. If a downshift command signal is produced by the shift-down lever Ld, then control goes from the step S2 to a step S5 for a shift-down control process.

Figure 9:
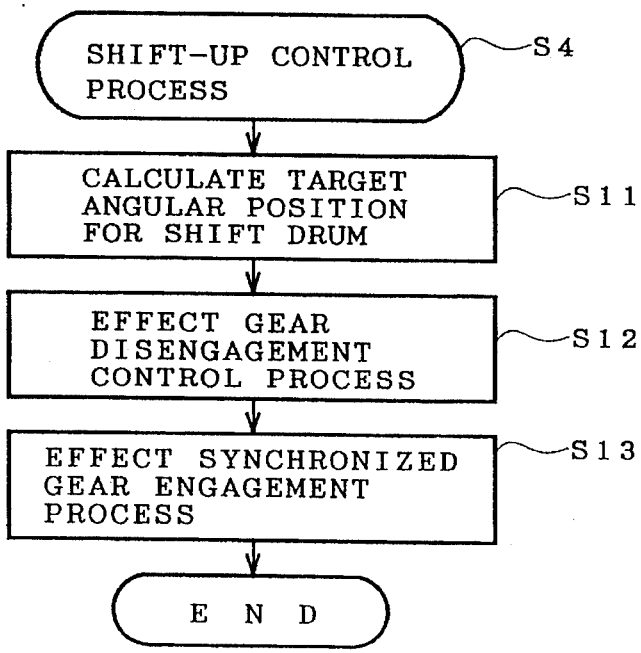
FIG. 9 is a flowchart of a subroutine of the gear-change control sequence of the system.

The shift-up control process for shifting the transmission M from the nth gear position (present gear position) to the (n+1)th gear position (next gear position), for example, will be described below with reference to FIG. 9.

In the shift-up control process, a shift target value, i.e., a target angular position for the shift drum 24 to reach with the shift motor 26, is calculated from the type of the produced upshift command signal in a step S11. Then, a step S12 carries out a gear disengagement control process for releasing the roller synchronizing mechanism RS that is establishing the present nth gear position.

Figure 10:
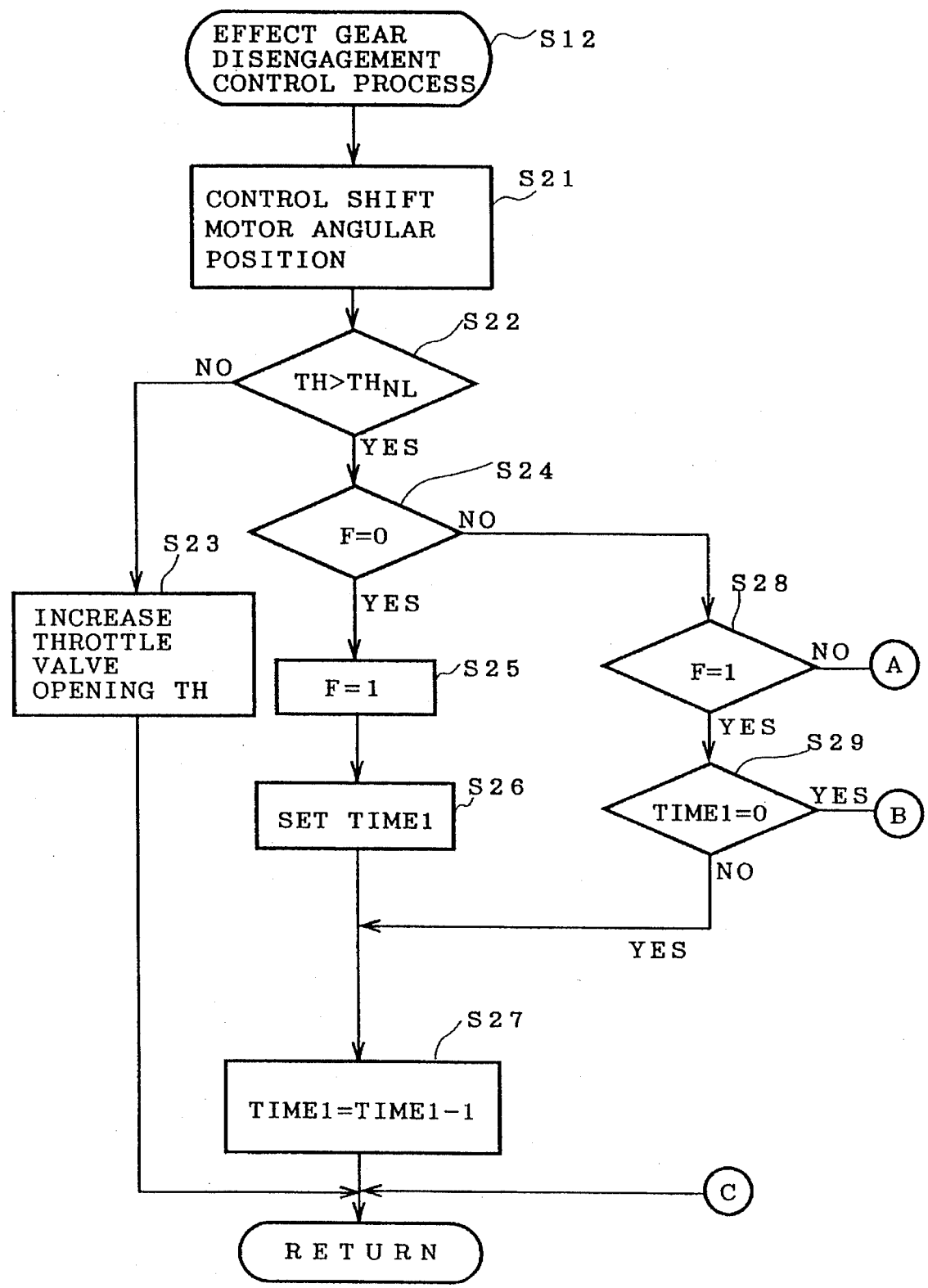
FIGS. 10, 11, and 12 are a flowchart of a subroutine of the gear-change control sequence of the system.
Figure 11:
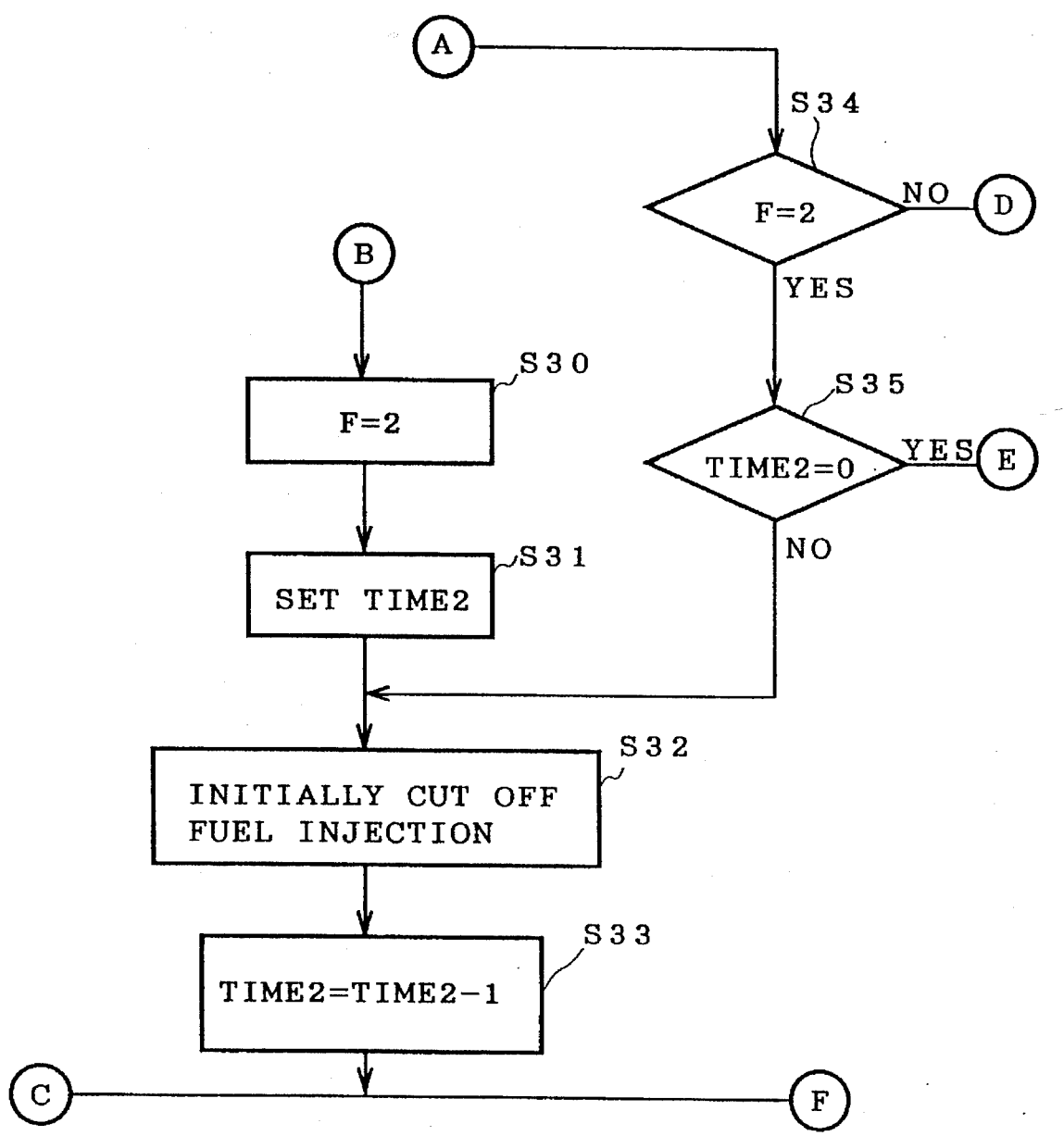
Figure 12:
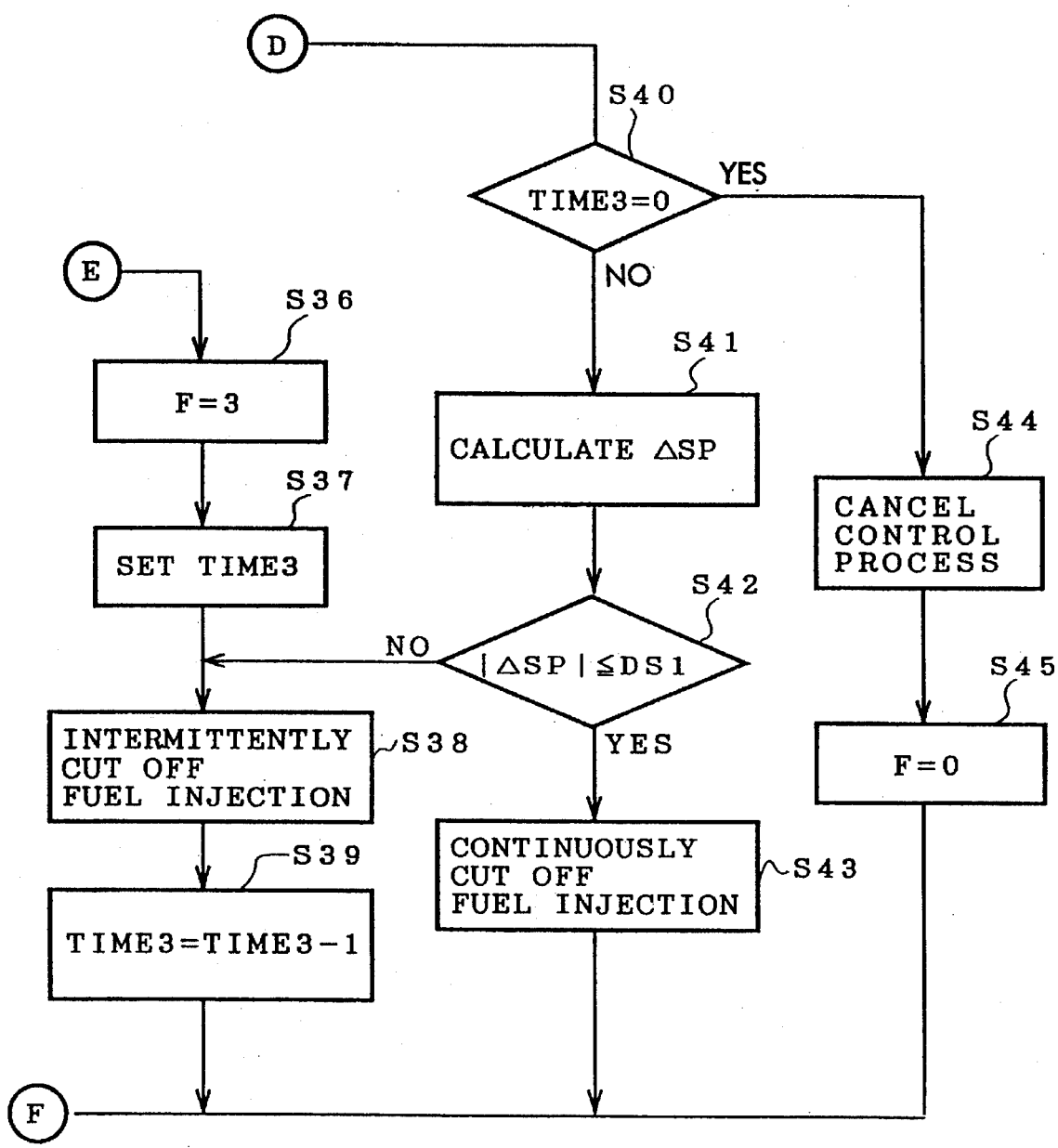

The gear disengagement control process in the step S12 will be described in detail with reference to a flowchart shown in FIGS. 10 through 12 and timing charts shown in FIGS. 14(a) through 14(d).

First, the angular position of the shift motor 26 is controlled based on time calculated shift target value in a step S21. The shift motor 26 is energized to cause the shift drum 24 to start rotating, with a slight time lag, from a position SP(P) (see FIG. 14(b)) corresponding to the present nth gear position toward a position corresponding to the next (n+1)th gear position which is to be achieved.

However, since a drive torque is being transmitted through the roller synchronizing mechanism RS, the sleeve 8 does not axially move and hence the dowels 8a do not enter the dowel insertion slots 13a2 because of frictional forces due to the drive torque being transmitted. As the shift drum 24 rotates, therefore, the shift fork 30 (31, 32) moves as indicated by SP(1) in FIG. 14(b) by an interval corresponding to the play between the shift fork and the sleeve 8, and than stops after having reached a position SP(2). In the position SP(2), the sleeve 8 does not move while it is subjected to an axial push from the shift motor 26, and the dowels 8a are positioned out of the dowel insertion slots 13a2. The roller synchronizing mechanism RS for the present nth gear position thus remains engaged.

Then, a step S22 determines whether the throttle valve opening TH as detected by the throttle valve opening sensor SE1 is greater than a non-lead throttle valve opening THNL.

Figure 13:
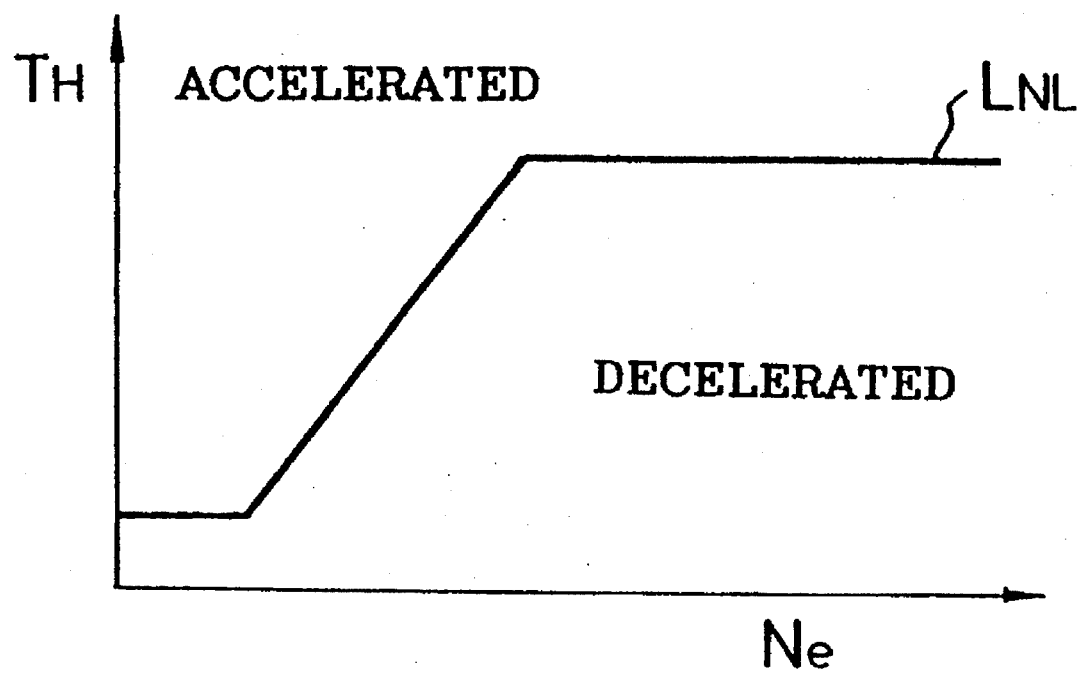
FIG. 13 is a graph showing the relationship between the throttle valve opening of an engine, the rotational speed of the engine, and the output power of the engine.

Such a detection is based on the graph of FIG. 13 which shows a non-load line LNL where the output torque TQ of the engine EN at the roller synchronizing mechanism RS for the present gear position is zero, i.e., no load is transmitted between drive and driven members of the roller synchronizing mechanism RS for the present gear position, based on the relationship between the throttle valve opening TH and the engine rotational speed Ne. The throttle valve opening on the non-load line LNL represents the non-load throttle valve opening THNL. Whether the detected throttle valve opening TH is greater than the non-load throttle valve opening THNL can be determined by comparing the detected throttle valve opening TH with the non-load throttle valve opening THNL.

When the throttle valve opening TH is larger than the non-load throttle valve opening THNL, then the engine EN is in an accelerated condition, and the drive torque is transmitted from the engine EN to the drive road wheels, i.e., from the main shaft SM through transmission gears to the countershaft SC. When the throttle valve opening TH is smaller than the non-load throttle valve opening THNL, then the engine EN is in a decelerated condition, and the drive torque is transmitted from the drive road wheels to the engine EN, i.e., from the countershaft SC through transmission gears to the main shaft SM.

In an upshift, the engine rotational speed Ne is lowered as the speed reduction ratio is reduced. According to the shift-up control process, therefore, the roller synchronizing mechanism RS for the present gear position is first brought into an accelerated condition, and then the output power of the engine is lowered until the output torque TQ of the engine EN at the roller synchronizing mechanism RS for the present gear position becomes zero, i.e., no load is transmitted between drive and driven members of the roller synchronizing mechanism RS for the present gear position, when the roller synchronizing mechanism RS for the present gear position is disengaged. Therefore, if the throttle valve opening TH is equal to or smaller than the non-load throttle valve opening THNL in the step S22, then control goes to a step S23 in which the throttle valve opening TH is increased to an opening (THNL+$\alpha$) greater than the non-load throttle valve opening THNL for bringing the synchronizing mechanism RS for the present gear position into an accelerated condition.

If the throttle valve opening TH is larger than the non-load throttle valve opening THNL in the step S22, then control proceeds to a step S24 which determines whether a flag F that is initially set to zero is zero or not. Since the flag F is initially F=0, control goes from the step S24 to a step S25. The flag F is set to F=1 in the step S25, and then a delay timer TIME1 is set in a step S26.

Thereafter, the time TIME1 to which the delay timer TIME1 is set is decremented by 1 (TIME1=TIME1−1) in a step S27. In following cycles, since the flag F is F=1, control goes from the step S24 through a step S28 which determines whether the flag F is 1 or not, and a step S29 which determines whether the time TIME1 is 0 or not to the step S27. This loop is repeated until the time TIME1 elapses.

When the time TIME1 elapses (TIME1=0) in the step S29, control goes to a step S30 in which the flag F is set to F=2 and then a step S31 in which a cut-off timer TIME2 is set. After the step S31, the fuel injection starts to be initially cut off in a step S32. Thereafter, the time TIME2 to which the cut-off timer TIME2 is set is decremented by 1 (TIME2= TIME2−1) in a step S33. In following cycles, since the flag F is F=2, control goes from the step S24 through a step S34 which determines whether the flag F is 2 or not, and a step S35 which determines whether the time TIME2 is 0 or not to the step S32 for initially cutting off the fuel injection once during the time to which the cut-off timer TIME2 is set. This loop is repeated until the time TIME2 elapses.

When the time TIME2 elapses (TIME2=0) in the step S35, control goes to a step S36 in which the flag F is set to F=3 and then a step S37 in which a canceling timer TIME3 is set. Then, an intermittent cutting-off of the fuel injection is started in a step S38, and the time TIME3 to which the canceling timer TIME3 is set is decremented by 1 (TIME3= TIME3−1) in a step S39.

The above control process is illustrated in FIGS. 14(a) through 14(d). When a shift-up command signal is issued at a time t0, the delay time TIME1 of the delay timer TIME1 up to a time t1 is awaited. Thereafter, the fuel injection is initially cut off during the time TIME2 of the cut-off timer TIME2, i.e., from the time t1 to a time t2. After the time t2, time fuel injection is intermittently cut off repeatedly at a predetermined period.

Figure 14:
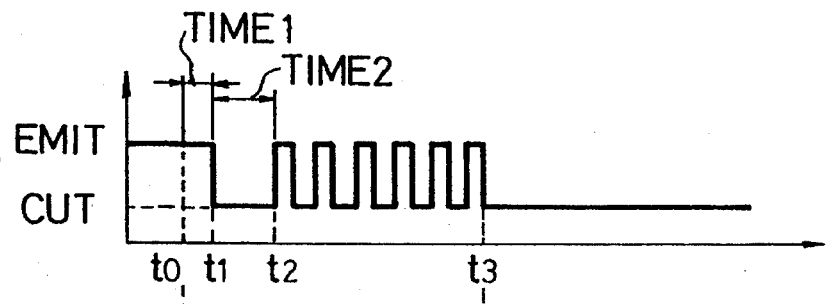
FIGS. 14(a), 14(b), 14(c), and 14(d) are graphs showing the fuel injection, the shift position, the engine rotational speed, and the engine torque, respectively, as they vary with time.
Figure 14:
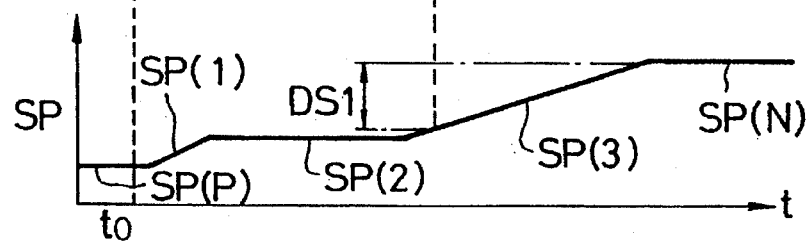
Figure 14:
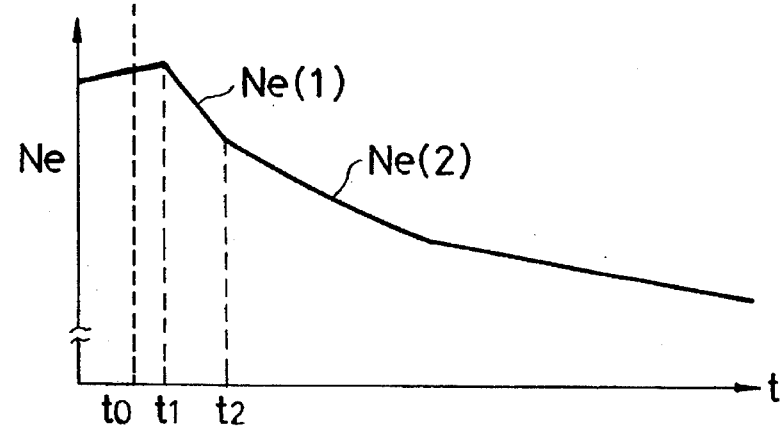
Figure 14:
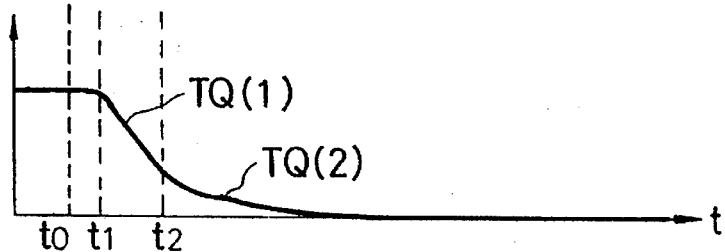

When the fuel injection is thus initially cut off, the output power of the engine EN is greatly lowered, i.e., the rotational speed Ne of the engine EN is quickly lowered as indicated by Ne(1) in FIG. 14(c), and the output torque TQ at the roller synchronizing mechanism RS for the present gear position is quickly lowered as indicated by TQ(1) in FIG. 14(d). When the fuel injection is thereafter intermittently cut off, the engine rotational speed Ne and the engine output torque TQ are gradually lowered as indicated by Ne(2) in FIG. 14(c) and TQ(2) in FIG. 14(d). The output torque TQ at the roller synchronizing mechanism RS for the present gear position rapidly approaches a zero torque level at which no load is transmitted between the drive and driven members of the roller synchronizing mechanism RS. After the output torque TQ reaches a level close to the zero torque level, it gradually approaches the zero torque level.

The above control process for cutting off the fuel injection is effected to eliminate the output torque TQ at the roller synchronizing mechanism RS for the present gear position, i.e., to eliminate any load between the drive and driven members of the roller synchronizing mechanism RS. If the time during which the fuel injection is cut off were too long, however, the output torque TQ would be lowered excessively, allowing the engine to be driven from the drive road wheels. The time during which the fuel injection is to be cut off, particularly the time during which the fuel injection is to be initially cut off (initial cut-off time), is set depending on the magnitude of the engine output power before the fuel injection is cut off. Specifically, the greater the engine output power, the longer the initial cut-off time is set.

The initial cut-off time may be determined in advance with respect to the output torque TQ when the fuel injection starts to be cut off, or may be selected such that the fuel injection is cut off until the engine rotational speed drops a certain speed, e.g., 300 rpm.

When the output torque TQ at the roller synchronizing mechanism RS for the present gear position, i.e., any load between the drive and driven members of the roller synchronizing mechanism RS, is eliminated, since the drive force applied to the roller synchronizing mechanism RS for the present gear position falls to zero, the frictional resistance to axial movement of the sleeve 8 is substantially eliminated. The sleeve 8 is now axially moved under the axial push from the shift motor 26, inserting the dowels 8a into the respective dowel insertion slots 13a2 of the retainer 13a. The shift fork moves from the position SP(2) through a position SP(3) to a neutral position SP(N), as shown in FIG. 14(b). When the shift fork reaches the neutral position SP(N), the shift motor 26 is temporarily de-energized. In the neutral position SP(N), the dowels 8a are fully fitted in the respective dowel insertion slots 13a2 as shown in FIG. 5.

From the time the flag F is set to F=3, the difference ΔSP between the neutral position SP(N) and an actual shift fork position when the shift fork moves to the neutral position SP(N) is detected in steps S40, S41. A step S42 determines whether or not the absolute value of the difference ΔSP is equal to or smaller than a first predetermined value DS1 (ΔSP≦DS1) to determine whether the sleeve 8 has started to move or not. The first predetermined value DS1 is selected to be slightly smaller than the difference between the position SP(2) and the neutral position SP(N).

When-the sleeve 8 has started to move, since the output torque TQ of the engine EN is substantially eliminated, control proceeds to a step S43 in which the intermittent cutting-off of the fuel injection is stopped and the fuel injection is continuously cut off.

If the absolute value of the difference ΔSP is greater than the first predetermined value DS1 (ΔSP<DS1) continuously for the time TIME3 of the canceling timer TIME3, i.e., if the sleeve 8 does move and the neutral position is not reached even after elapse of the time TIME3, then control goes to a step S44 in which the present shift-up control process is canceled and a step S45 in which the flag F is set to F=0.

When the roller synchronizing mechanism RS for the present nth gear position is brought into a neutral condition by-the gear disengagement control process in the step S12, control proceeds to a step S13 which carries out a synchronized gear engagement control process.

Figure 15:
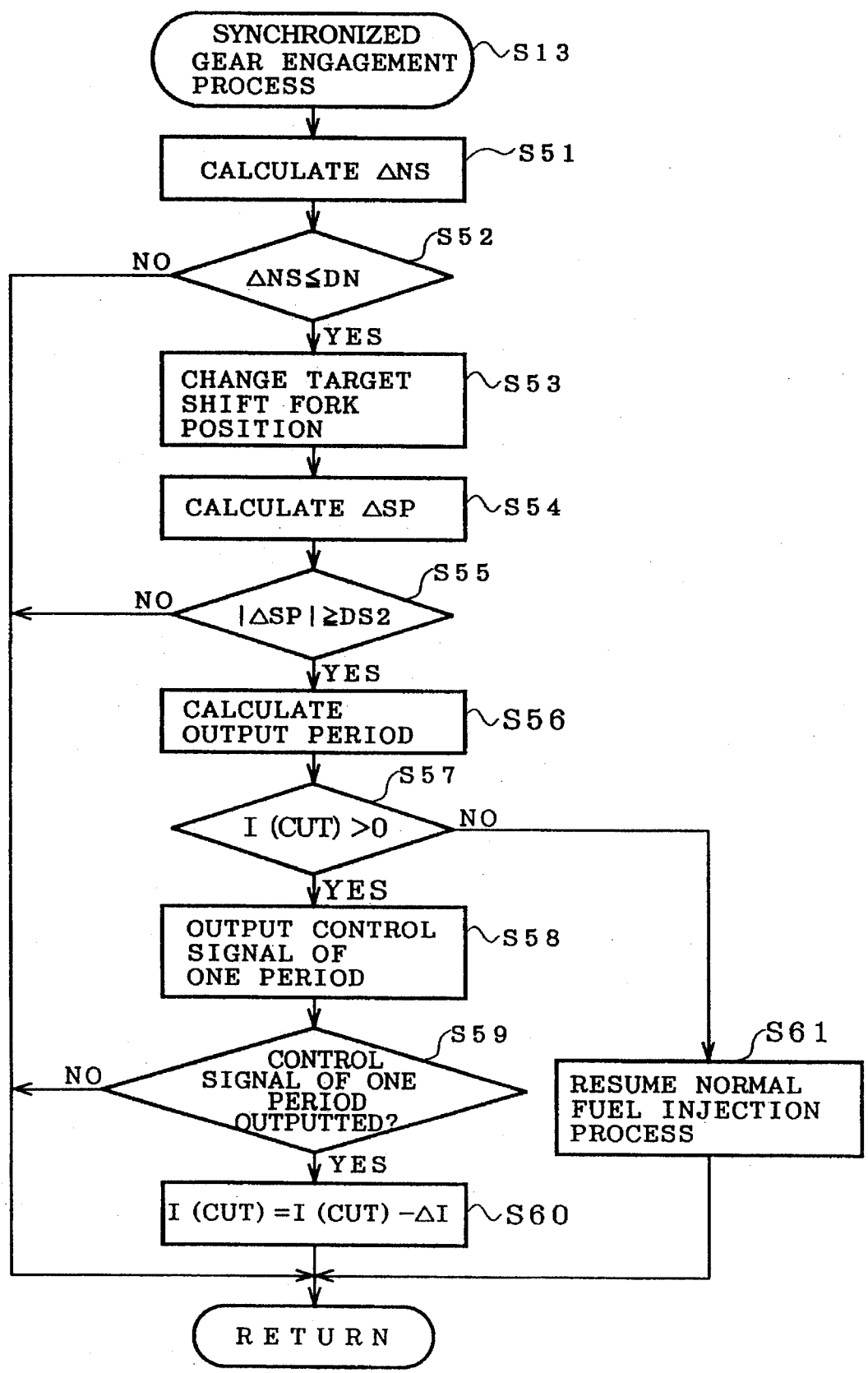
FIG. 15 is a flowchart of a subroutine of the gear-change control sequence of the system.
Figure 16:
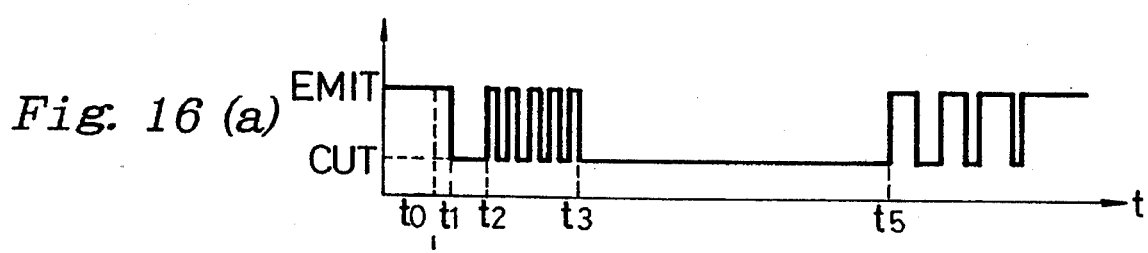
FIGS. 16(a), 16(b), and 16(c) are graphs showing the fuel injection, the shift position, and the transmission shaft rotational speed, respectively, as they vary with time.
Figure 16:
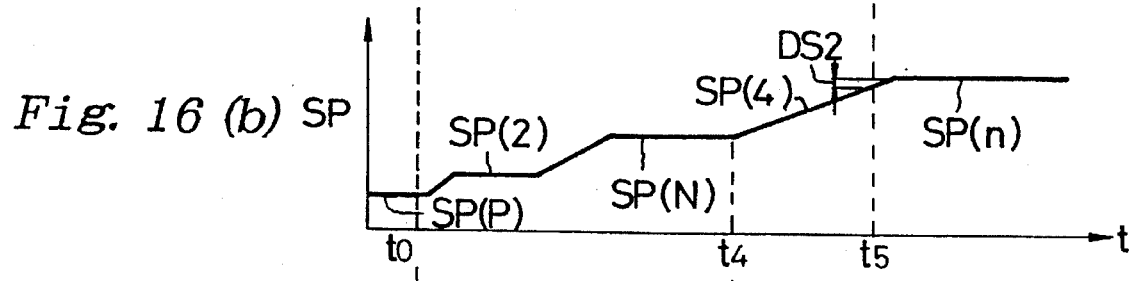
Figure 16:
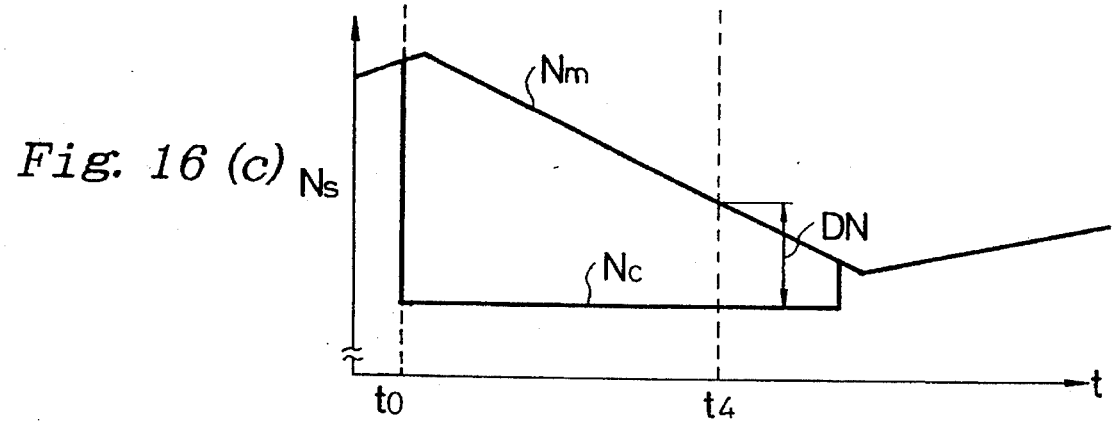

The synchronized gear engagement control process, which is effected when the fuel injection is continuously cut off after the time t3 in FIGS. 14(a) and 16(a). The synchronized gear engagement control process will now be described below with reference to FIG. 15. FIGS. 16(a) through 16(c) are timing charts of the synchronized gear engagement control process in its entirety, and FIGS. 14(a) through 14(d) show an initial portion of the synchronized gear engagement control process in which the roller synchronizing mechanism for the present gear position is disengaged to achieve the neutral condition.

FIG. 16(c) shows the rotational speed Nm of the main shaft SM and the rotational speed Nc of the countershaft SC as they vary with time, the rotational speeds Nm, Nc being shown as converted into those of one shaft in the gear position at the time. Before a gear-change command signal is issued, the rotational speeds Nm, Nc are the same as each other. When a shift-up command signal is issued, since the rotational speeds Nm, Nc change to rotational speeds corresponding to the next gear position, i.e., the (n+1)th gear position, the rotational speed Nc of the countershaft SC is lowered. The rotational speed Nm of the main shaft SM is equal to the engine rotational speed as long as the clutch CL is engaged.

When the roller synchronizing mechanism RS for the present nth gear position is disengaged into the neutral condition and the fuel injection is continuously cut off, the rotational speed Nm of the main shaft SM quickly drops and approaches the rotational speed Nc of the countershaft SC as shown in FIG. 16(c). A step S51 calculates the difference ΔNs between the rotational speeds Nm, Nc, and then a step S52 determines whether or not time difference ΔNs is equal to or lower than a predetermined difference DN.

If ΔNs≦DN at a time t4 (FIG. 16(c)), then the position of the shift fork 30 is changed from the present neutral position SP(N) to a next position SP(n) for the next (n+1)th gear position in a step S53. The shift fork 30 starts moving to the next position SP(n) at the time t4 as indicated by a curve SP(4) in FIG. 16(c).

As the shift fork 30 moves to the next position SP(n), the dowels 8b are displaced out of the respective dowel insertion slots 13b2. The roller synchronizing mechanism RS for the next (n+1)th gear is engaged, so that the rotational speeds Nm, Nc are equalized with each other.

A step S54 calculates the positional difference ΔSP between the actual shift fork position SP and the next shift fork position SP(n). A step S55 then determines whether or not the absolute value of the positional difference ΔSP is equal to or greater than a second predetermined value DS2. If |ΔSP|≦DS2 at a time t5, then the cutting-off of the fuel injection starts being gradually canceled from the time t5 in steps S56 through S61.

More specifically, a fuel injection control signal of one period having a predetermined fuel cut-off time I(CUT) is issued in the steps S58, S59. Then, a fuel injection control signal of one period having a predetermined fuel cut-off time which is shorter than the fuel cut-off time I(CUT) by ΔI is issued in the step S60. This loop is repeated to gradually reduce the fuel cut-off time. When I(CUT)<0, the normal fuel injection process is resumed in the steps S57, S61.

Figure 18:
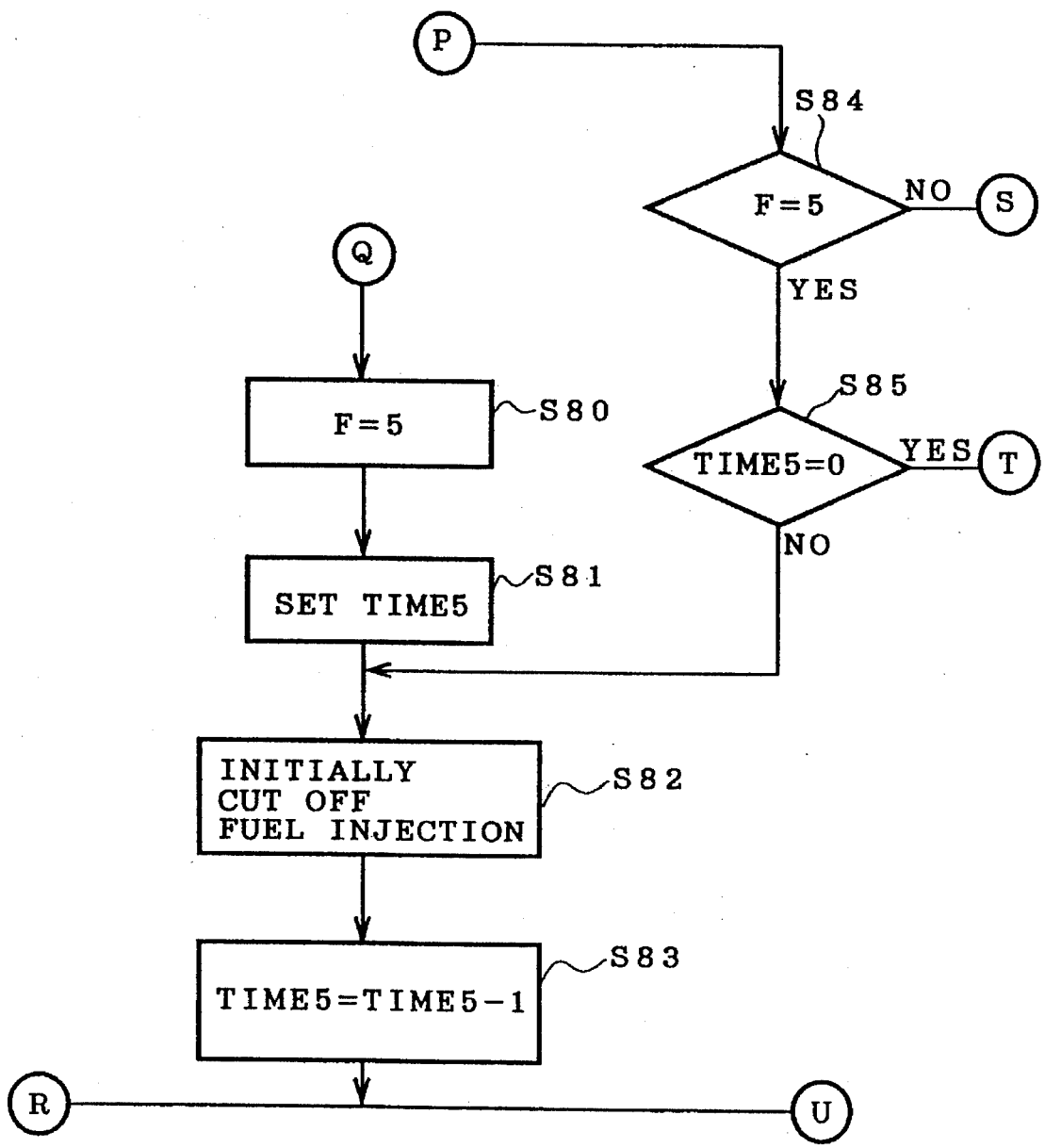
Figure 19:
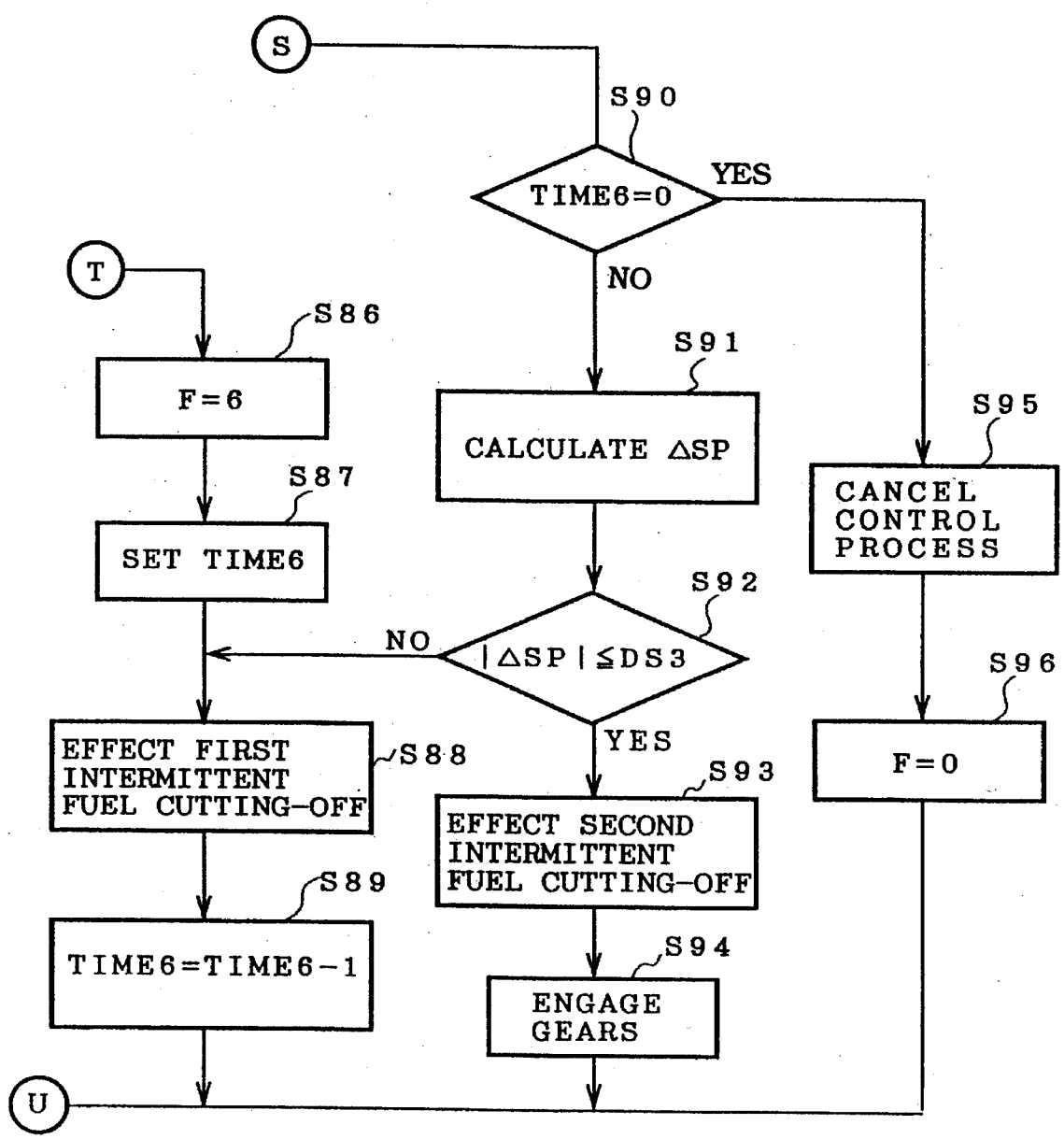

The shift-up control process in the step S4 has been described above. Now, the shift-down control process in the step S5, for a downshift from the (n+1)th gear position to the nth gear position, will be described below with reference to a flowchart shown in FIGS. 17, 18, and 19, and timing charts shown in FIGS. 20(a), 20(b), 20(c), and 20(d).

In the shift-down control process, a shift target value, i.e., a target angular position for the shift drum 24 to reach with the shift motor 26, is calculated from the type of the produced upshift command signal in a step S71. Then, a gear disengagement control process for releasing the roller synchronizing mechanism RS that is establishing the present (n+1)th gear position.

First, the angular position of the shift motor 26 is controlled based on the calculated shift target value in a step S72. The shift motor 26 is energized to cause the shift drum 24 to start rotating, with a slight time lag, from the position SP(P) (see FIG. 20(b)) corresponding to the present (n+1)th gear position toward the position corresponding to the next nth gear position which is to be achieved.

However, since a drive torque is being transmitted through the roller synchronizing mechanism RS, the sleeve 8 does not axially move and hence the dowels 8b do not enter the dowel insertion slots 13b2 because of frictional forces due to the drive torque being transmitted. As the shift drum 24 rotates, therefore, the shift fork 30 (31, 32) moves as indicated by SP(1) in FIG. 20(b) by an interval corresponding to the play between the shift fork and the sleeve 8, and then stops after having reached a position SP(2). In the position SP(2), the sleeve 8 does not move while it is subjected to an axial push from the shift motor 26, and the dowels 8b are positioned out of the dowel insertion slots 13b2. The roller synchronizing mechanism RS for the present (n+1)th gear position thus remains engaged.

Then, a step S73 controls the throttle valve opening TH to reach a target opening, which is a full throttle valve opening WOT here, regardless of the condition of the accelerator pedal PA.

In a downshift, the engine rotational speed Ne is increased as the speed reduction ratio is increased. According to the shift-down control process, therefore, the roller synchronizing mechanism RS for the present gear position is first brought into a decelerated condition, and then the output power of the engine is increased until the output torque TQ of the engine EN at the roller synchronizing mechanism RS for the present gear position becomes zero, i.e., no load is transmitted between drive and driven members of the roller synchronizing mechanism RS for the present gear position, when the roller synchronizing mechanism RS for the present gear position is disengaged. The throttle valve opening TH is thus controlled to reach the target opening WOT in the step S73 to increase the output power of the engine EN.

In the decelerated condition, the drive torque is transmitted from the drive road wheels to the engine EN, i.e., from the countershaft SC to the main shaft SM through transmission gears. In the accelerated condition, the drive torque is transmitted from the engine EN to the drive road wheels, i.e., from the main shaft SM to the countershaft SC.

Then, a step S74 determines whether a flag F that is initially set to zero is zero or not. Since the flag F is initially F=0, control goes from the step S74 to a step S75. The flag F is set to F=4 in the step S75, and then a delay timer TIME4 is set in a step S76.

Thereafter, the time TIME4 to which the delay timer TIME4 is set is decremented by 1 (TIME4=TIME4−1) in a step S77. In following cycles, since the flag F is F=4, control goes from the step S74 through a step S78 which determines whether time flag F is 4 or not, and a step S79 which determines whether the time TIME4 is 0 or not to the step S77. This loop is repeated until the time TIME4 elapses.

When the time TIME4 elapses (TIME4=0) in the step S79, control goes to a step S80 in which the flag F is set to F=5 and then a step S81 in which a cut-off timer TIME5 is set. After the step S81, the fuel injection starts to be initially cut off in a step S82. Thereafter, the time TIME5 to which the cut-off timer TIME5 is set is decremented by 1 (TIME5=TIME5−1) in a step S83. In following cycles, since the flag F is F=5, control goes from the step S74 through a step S84 which determines whether the flag F is 5 or not, and a step S85 which determines whether the time TIME5 is 0 or not to the step S82 for initially cutting off the fuel injection once during the time to which the cut-off timer TIME5 is set. This loop is repeated until the time TIME5 elapses.

When the fuel injection is initially cut off, the output power of the engine EN is lowered to decelerate the automobile. The time for which the fuel injection is initially cut off is set to a value long enough to lower the output torque of the engine into a negative value to decelerate the automobile. The greater the output power of the engine EN, the longer the time TIME5 for which the fuel injection is initially cut off.

When the time TIME5 elapses (TIME5=0) in the step S85, control goes to a step S86 in which the flag F is set to F=6 and then a step S87 in which a canceling timer TIME6 is set. Then, a first intermittent cutting-off of the fuel injection is started in a step S88, and the time TIME6 to which the canceling timer TIME6 is set is decremented by 1 (TIME6=TIME6−1) in a step S89.

When the fuel injection is initially cut off, the output power of the engine is greatly lowered to decelerate the automobile. Thereafter, the first intermittent cutting-off of the fuel injection is effected with the full throttle valve opening WOT to gradually increase the output power of the engine.

When the output torque TQ at the roller synchronizing mechanism RS for the present gear position, i.e., any load between the drive and driven members of the roller synchronizing mechanism RS, is eliminated, since the drive force applied to time roller synchronizing mechanism RS for the present gear position falls to zero, the frictional resistance to axial movement of the sleeve 8 is substantially eliminated. The sleeve 8 is now axially moved under the axial push from the shift motor 26, inserting the dowels 8b into the respective dowel insertion slots 13b2 of the retainer 13b. The shift fork moves from the position SP(2) through a position SP(3) to a neutral position SP(N), as shown in FIG. 20(b). When the shift fork reaches the neutral position SP(N), time shift motor 26 is temporarily de-energized. In the neutral position SP(N), the dowels 8b are fully fitted in the respective dowel insertion slots 13b2 as shown in FIG. 5.

The difference ΔSP between the neutral position SP(N) and an actual shift fork position widen the shift fork moves to the neutral position SP(N) is detected in a step S91. A step S92 determines whether or not the absolute value of the difference ΔSP is equal to or smaller than a third predetermined value DS3 (ΔSP≦DS3) to determine whether the sleeve 8 has started to move or not. The third predetermined value DS3 is selected to be slightly smaller than the difference between the position SP(2) and the neutral position SP(N).

When time sleeve 8 has started to move, since the output torque TQ of the engine EN is substantially eliminated, control proceeds to a step S93 in which a second intermittent cutting-off of the fuel injection is effected and then a step S94 in which gears are engaged.

If the absolute value of time difference ΔSP is greater than the third predetermined value DS3 (ΔSP<DS3) continuously for the time TIME6 of time canceling timer TIME6, i.e., if the sleeve 8 does move axed the neutral position is not reached even after elapse of the time TIME6, then control goes to a step S95 in which the present shift-down control process is canceled and a step S96 in which the flag F is set to F=O.

The gear disengagement control process is carried out in the above manner. When the roller synchronizing mechanism RS for the present (n+1)th gear position is brought into a neutral condition by the gear disengagement control process, a synchronized gear engagement control process is executed in a step S94.

The synchronized gear engagement control process is effected after the second intermittent cutting-off of the fuel injection in the step S93. The synchronized gear engagement control process is the same as that in the shift-up control process according to the flowchart shown in FIG. 15 except that the rotational speeds of the main shaft and countershaft vary as follows:

As shown in FIG. 20(d), when a shift-down command signal is issued, the rotational speed Nc of the countershaft SC as the rotational speed corresponding to the next nth gear position becomes higher than the rotational speed Nm of the main shaft SM.

When the roller synchronizing mechanism RS for the present (n+1)th gear position is disengaged into the neutral condition and the second intermittent cutting-off of the fuel injection is effected, the rotational speed Nm of the main shaft SM rises and approaches the rotational speed Nc of the countershaft SC as shown in FIG. 20(d). The process for controlling the second intermittent cutting-off of the fuel injection is a feedback control process for making the rotational speed Nm approach the rotational speed Nc. The step S51 calculates the difference ΔNs between the rotational speeds Nm, Nc, and then the step S52 determines whether or not the difference ΔNs is equal to or lower than the predetermined difference DN.

If ΔNs≦DN, then the position of the shift fork 30 is changed from the present neutral position SP(N) to a next position SP(n) for the next nth gear position in the step S53. The shift fork 30 starts moving to the next position SP(n) at the time t4 as indicated by the curve SP(4) in FIG. 20(b).

As the shift fork 30 moves to the next position SP(n), the dowels 8a are displaced out of the respective dowel insertion slots 13a2. The roller synchronizing mechanism RS for the next nth gear is engaged, so that the rotational speeds Nm, Nc are equalized with each other.

The step S54 calculates the positional difference ΔSP between the actual shift fork position SP and the next shift fork position SP(n). The step S55 then determines whether or not the absolute value of the positional difference ΔSP is equal to or greater than the second predetermined value DS2. If |ΔSP|≦DS2, then the cutting-off of the fuel injection starts being gradually canceled from that time in the steps S56 through S61.

Figure 17:
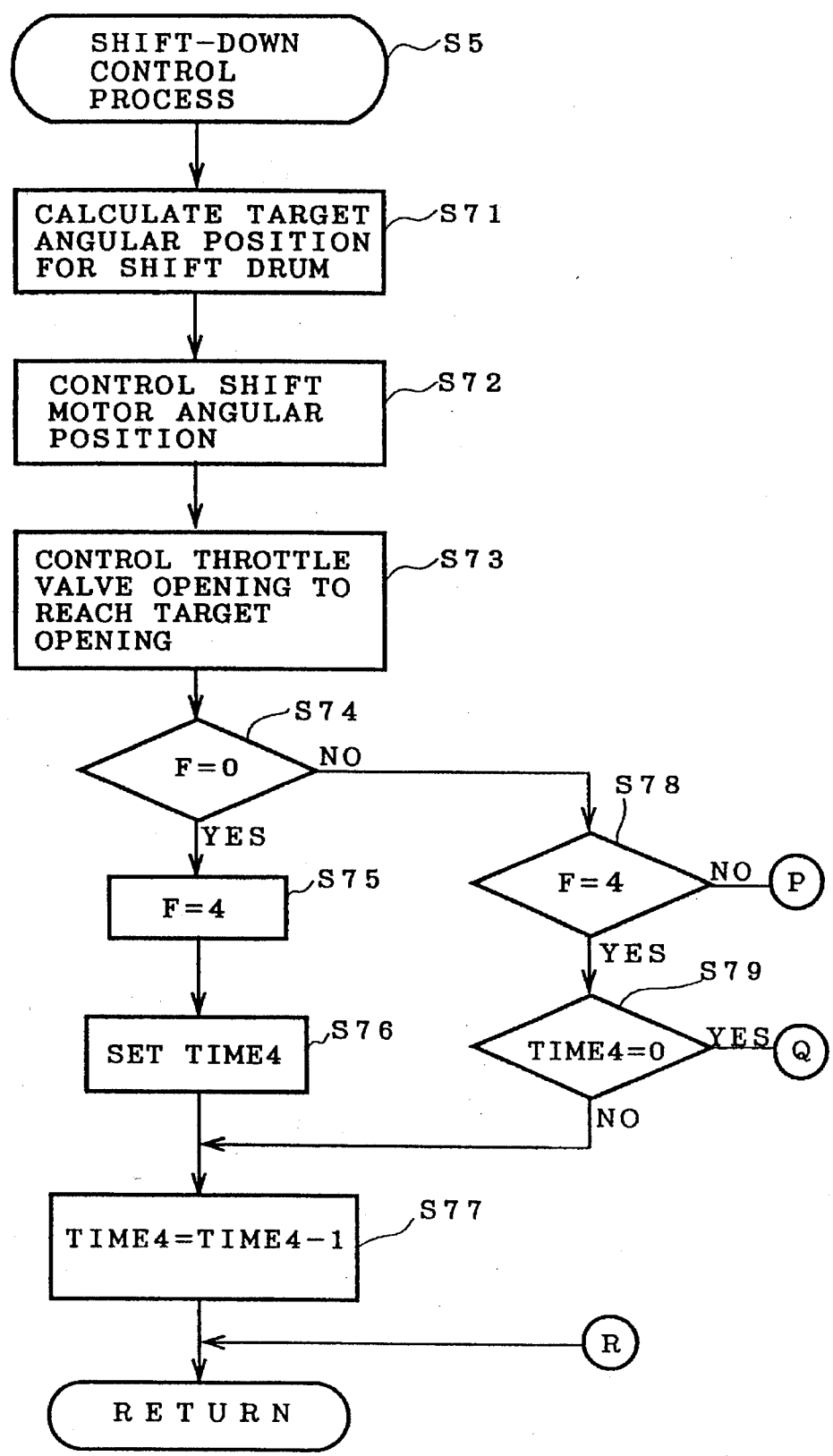
FIGS. 17, 18, and 19 are a flowchart of a subroutine of the gear-change control sequence of the system.

In the above embodiment, as shown in FIG. 1, the throttle valve TV is disposed in the intake passage of the engine EN, and the throttle valve TV is fully opened in the step S73 shown in FIG. 17.

However, as shown in FIG. 21 which illustrates an automobile transmission control system according to another embodiment of the present invention, a bypass intake passage BP may be connected parallel to a main intake passage MP with a throttle valve TV disposed therein, and a bypass opening/closing valve BV may be disposed in the bypass intake passage BP for selectively opening and closing the bypass intake passage BP. The bypass opening/closing valve BV can be opened and closed by an electromagnetic solenoid BS which is electrically connected to the electronic control unit UC. The other details of the automobile transmission control system shown in FIG. 21 are time same as those of the automobile transmission control system shown in FIG. 1.

In the automobile transmission control system shown in FIG. 21, the process of controlling the throttle valve opening TH to reach a target opening in the step S73 shown in FIG. 17 is carried out as follows: As shown in FIGS. 22(a) through 22(e), the throttle valve TV is fully closed, and the bypass opening/closing valve BV is fully opened to supply intake air through the bypass intake passage BP to the engine EN. The throttle valve opening control process is effected quickly because any response delay caused when the bypass opening/closing valve BV is fully opened is relatively small (as shown by the vertical line in FIG. 22(d) between OFF and ON) although a relatively large response delay is experienced closing throttle valve TV when the throttle valve TV starts from a fully opened condition (as shown by the inclined line in FIG. 22(c).

Although certain preferred embodiments of the present invention have been shown and described in detail, it should be understood that various changes and modifications may be made therein without departing from the scope of the appended claims.

What is claimed is:

1. A system for controlling an automobile transmission to effect a gear change by disengaging synchronizing clutch means for a present gear position, achieving a neutral gear position, and then engaging synchronizing clutch means for a next gear position in response to a shift control signal, said system comprising:

shift command means for outputting a shift command signal;

an actuator for selectively engaging and disengaging the synchronizing clutch means;

engine output adjusting means for adjusting an output power of an engine; and control means for controlling said engine output adjusting means to adjust the output power of the engine and controlling said actuator to start disengaging said synchronizing clutch means for a present gear position in response to the shift command signal outputted by said shift command means, and for controlling said actuator to complete disengaging said synchronizing clutch means for a present gear position to enter the neutral gear position when substantially no load is transmitted between drive and driven members of the synchronizing clutch means for a present gear position under the control of said engine output adjusting means;

wherein said engine output adjusting means comprises means responsive to the shift command signal from said shift command means for effecting a first engine output adjusting mode to quickly lower the output power of the engine for a first period of time from the reception of the shift command signal, and effecting a second engine output adjusting mode to gradually lower the output power of the engine for a second period of time following said first period of time, and wherein said control means comprises means responsive to the shift command signal from said shift command means for controlling said actuator to start disengaging said synchronizing clutch means for a present gear position and to complete disengaging said synchronizing clutch means for a present gear position to enter the neutral gear position when substantially no load is transmitted between the drive and driven members of the synchronizing clutch means for a present gear position in said second engine output adjusting mode effected by said engine output adjusting means.

2. A system according to claim 1, wherein said engine output adjusting means comprises engine output generating means for generating the output power of the engine and engine output controlling means for controlling said engine output generating means, said engine output controlling means comprising means responsive to the shift command signal from said shift command means for effecting a first engine output adjusting mode to shut off said engine output generating means for a first period of time from the reception of the shift command signal, and effecting a second engine output adjusting mode to intermittently shut off said engine output generating means for a second period of time following said first period of time, and wherein said control means comprises means responsive to the shift command signal from said shift command means for controlling said actuator to start disengaging said synchronizing clutch means for a present gear position and to complete disengaging said synchronizing clutch means for a present gear position to enter the neutral gear position when substantially no load is transmitted between the drive and driven members of the synchronizing clutch means for a present gear position in said second engine output adjusting mode effected by said engine output controlling means.

3. A system according to claim 2, wherein said engine output generating means comprises ignition controlling means for controlling ignition of the engine, said control means comprising means for completely shutting off said ignition controlling means in said first engine output adjusting mode and intermittently shutting off said ignition controlling means in said second engine output adjusting mode.

4. A system according to claim 2, wherein said engine output generating means comprises fuel injection controlling means for controlling fuel injection of the engine, said control means comprising means for completely cutting off fuel injection by said fuel injection controlling means in said first engine output adjusting mode and intermittently cutting off fuel injection by said fuel injection controlling means in said second engine output adjusting mode.

5. A system according to claim 1, wherein said engine output adjusting means comprises engine output generating means for generating the output power of the engine, engine output controlling means for controlling said engine output generating means, and intake control means for adjusting the amount of intake air to be supplied to the engine, said control means comprising means responsive to the shift command signal from said shift command means for controlling said intake control means to increase the amount of intake air and controlling said actuator to start disengaging said synchronizing clutch means for a present gear position, said engine output controlling means comprising means for shutting off said engine output generating means to bring said synchronizing clutch means for a present gear position into a decelerated condition for a first period of time from the reception of the shift command signal, and said control means comprising means for controlling said actuator to complete disengaging said synchronizing clutch means for a present gear position to enter the neutral gear position when the output power of the engine is increased until no load is transmitted between the drive and driven members of the synchronizing clutch means for a present gear position.

6. A system according to claim 5, wherein said engine output controlling means comprises means for effecting a first engine output adjusting mode to shut off said engine output generating means for a first period of time from the reception of the shift command signal, and effecting a second engine output adjusting mode to intermittently shut off said engine output generating means for a second period of time following said first period of time.

7. A system according to claim 6, wherein said shift command signal comprises a command signal for instructing the automobile transmission to effect a downshift.

8. A system according to claim 6, wherein said engine output generating means comprises ignition controlling means for controlling ignition of the engine, said control means comprising means for completely shutting off said ignition controlling means in said first engine output adjusting mode and intermittently shutting off said ignition controlling means in said second engine output adjusting mode.

9. A system according to claim 6, wherein said engine output generating means comprises fuel injection controlling means for controlling fuel injection of the engine, said control means comprising means for completely cutting of fuel injection by said fuel injection controlling means in said first engine output adjusting mode and intermittently cutting off fuel injection by said fuel injection controlling means in said second engine output adjusting mode.

10. A system according to claim 8, wherein said shift command signal comprises a command signal for instructing the automobile transmission to effect a downshift.

11. A system according to claim 9, wherein said shift command signal comprises a command signal for instructing the automobile transmission to effect a downshift.

12. A system according to claim 1, wherein said engine output adjusting means comprises engine output generating means for generating the output power of the engine, engine output controlling means for controlling said engine output generating means, a throttle valve for adjusting the amount of intake air to be supplied to the engine, a bypass intake passage for supplying intake air to the engine in bypassing relationship to said throttle valve, and bypass opening/closing means for selectively opening and closing said bypass intake passage, said control means comprising means responsive to the shift command signal from said shift command means for fully closing said throttle valve and fully opening said bypass opening/closing means, said engine output controlling means comprising means for effecting a first engine output adjusting mode to shut off said engine output generating means for a first period of time from the reception of the shift command signal, and effecting a second engine output adjusting mode to intermittently shut off said engine output generating means for a second period of time following said first period of time, said control means comprising means for controlling said actuator to start disengaging said synchronizing clutch means for a present gear position from the reception of the shift command signal and to complete disengaging said synchronizing clutch means for a present gear position to enter the neutral gear position when substantially no load is transmitted between the drive and driven members of the synchronizing clutch means for a present gear position in said second engine output adjusting mode effected by said engine output controlling means.

13. A system according to claim 12, wherein said engine output generating means comprises fuel injection controlling means for controlling fuel injection of the engine, said control means comprising means for completely cutting off fuel injection by said fuel injection controlling means in said first engine output adjusting mode and intermittently cutting off fuel injection by said fuel injection controlling means in said second engine output adjusting mode.

14. A system according to claim 13, wherein said shift command signal comprises a command signal for instructing the automobile transmission to effect a downshift.

15. A system according to claim 12, wherein said engine output generating means comprises ignition controlling means for controlling ignition of the engine, said control means comprising means for completely shutting off said ignition controlling means in said first engine output adjusting mode and intermittently shutting off said ignition controlling means in said second engine output adjusting mode.

16. A system according to claim 15, wherein said shift command signal comprises a command signal for instructing the automobile transmission to effect a downshift.

17. A system for controlling an automobile transmission to effect a gear change by disengaging synchronizing clutch means for a present gear position, achieving a neutral gear position, and then engaging synchronizing clutch means for a next gear position in response to a shift control signal, said system comprising:

shift command means for outputting a shift command signal;

an actuator for selectively engaging and disengaging the synchronizing clutch means;

engine output adjusting means for adjusting an output power of an engine; and control means for controlling said engine output adjusting means to adjust the output power of the engine and controlling said actuator to start disengaging said synchronizing clutch means for a present gear position in response to the shift command signal outputted by said shift command means, and for controlling said actuator to complete disengaging said synchronizing clutch means for a present gear position to enter the neutral gear position when substantially no load is transmitted between drive and driven members of the synchronizing clutch means for a present gear position under the control of said engine output adjusting means;

wherein said engine output adjusting means comprises engine output generating means for generating the output power of the engine and engine output controlling means for controlling said engine output generating means, said engine output controlling means comprising means responsive to the shift command signal from said shift command means for effecting a first engine output adjusting mode to shut off said engine output generating means for a first period of time from the reception of the shift command signal, and effecting a second engine output adjusting mode to intermittently shut off said engine output generating means for a second period of time following said first period of time, and wherein said control means comprises means responsive to the shift command signal from said shift command means for controlling said actuator to start disengaging said synchronizing clutch means for a present gear position and to complete disengaging said synchronizing clutch means for a present gear position to enter the neutral gear position when substantially no load is transmitted between the drive and driven members of the synchronizing clutch means for a present gear position in said second engine output adjusting mode effected by said engine output controlling means.

18. A system according to claim 17, wherein said engine output generating means comprises fuel injection controlling means for controlling fuel injection of the engine, said control means comprising means for completely cutting off fuel injection by said fuel injection controlling means in said first engine output adjusting mode and intermittently cutting off fuel injection by said fuel injection controlling means in said second engine output adjusting mode.

19. A system according to claim 17, wherein said engine output generating means comprises ignition controlling means for controlling ignition of the engine, said control means comprising means for completely shutting off said ignition controlling means in said first engine output adjusting mode and intermittently shutting off said ignition controlling means in said second engine output adjusting mode.

20. A system for controlling an automobile transmission to effect a gear change by disengaging synchronizing clutch means for a present gear position, achieving a neutral gear position, and then engaging synchronizing clutch means for a next gear position in response to a shift control signal, said system comprising:

shift command means for outputting a shift command signal;

an actuator for selectively engaging and disengaging the synchronizing clutch means;

engine output adjusting means for adjusting an output power of an engine; and control means for controlling said engine output adjusting means to adjust the output power of the engine and controlling said actuator to start disengaging said synchronizing clutch memos for a present gear position in response to the shift command signal outputted by said shift command means, and for controlling said actuator to complete disengaging said synchronizing clutch means for a present gear position to enter the neutral gear position when substantially no load is transmitted between drive and driven members of the synchronizing clutch means for a present gear position under the control of said engine output adjusting means;

wherein said engine output adjusting means comprises engine output generating means for generating the output power of the engine, engine output controlling means for controlling said engine output generating means, a throttle valve for adjusting the amount of intake air to be supplied to the engine, a bypass intake passage for supplying intake air to the engine in bypassing relationship to said throttle valve, and bypass opening/closing means for selectively opening and closing said bypass intake passage, said control means comprising means responsive to the shift command signal from said shift command means for fully closing said throttle valve and fully opening said bypass opening/closing means, said engine output controlling means comprising means for effecting a first engine output adjusting mode to shut off said engine output generating means for a first period of time from the reception of the shift command signal, and effecting a second engine output adjusting mode to intermittently shut off said engine output generating means for a second period of time following said first period of time, said control means comprising means for controlling said actuator to start disengaging said synchronizing clutch means for a present gear position from the reception of the shift command signal and to completely disengaging said synchronizing clutch means for a present gear position to enter the neutral gear position when substantially no load is transmitted between the drive and driven members of the synchronizing clutch means for a present gear position in said second engine output adjusting mode effected by said engine output controlling means.

21. A system according to claim 20, wherein said engine output generating means comprises ignition controlling means for controlling ignition of the engine, said control means comprising means for completely shutting off said ignition controlling means in said first engine output adjusting mode and intermittently shutting off said ignition controlling means in said second engine output adjusting mode.

22. A system according to claim 21, wherein said shift command signal comprises a command signal for instructing the automobile transmission to effect a downshift.

23. A system according to claim 20, wherein said engine output generating means comprises fuel injection controlling means for controlling the injection of the engine, said control means comprising means for completely cutting off fuel injection by said fuel injection controlling means in said first engine output adjusting mode and intermittently cutting off fuel injection by said fuel injection controlling means in said second engine output adjusting mode.

24. A system according to claim 23, wherein said shift command signal comprises a command signal for instructing the automobile transmission to effect a downshift.

* * * * *